United States Patent
Sun et al.

(10) Patent No.: US 11,570,808 B2
(45) Date of Patent: Jan. 31, 2023

(54) TWO-STEP RANDOM ACCESS PROCEDURE IN WIRELESS COMMUNICATION

(71) Applicant: QUALCOMM Incorporated, San Diego, CA (US)

(72) Inventors: Jing Sun, San Diego, CA (US); Xiaoxia Zhang, San Diego, CA (US); Peter Gaal, San Diego, CA (US); Stefan Brueck, Neunkirchen am Brand (DE)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 17/192,143

(22) Filed: Mar. 4, 2021

(65) Prior Publication Data

US 2021/0321451 A1    Oct. 14, 2021

Related U.S. Application Data

(60) Provisional application No. 63/007,031, filed on Apr. 8, 2020.

(51) Int. Cl.
*H04W 74/00* (2009.01)
*H04W 76/27* (2018.01)
*H04W 8/24* (2009.01)
*H04W 74/08* (2009.01)

(52) U.S. Cl.
CPC .......... *H04W 74/004* (2013.01); *H04W 8/24* (2013.01); *H04W 74/0833* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 10,270,570 B2* | 4/2019 | Liu | H04L 5/0091 |
| 10,321,335 B2* | 6/2019 | Hwang | H04L 41/08 |
| 10,609,687 B2* | 3/2020 | Yu | H04W 72/0406 |
| 10,687,248 B2* | 6/2020 | Babaei | H04W 28/06 |
| 10,693,610 B2* | 6/2020 | Liu | H04L 5/0098 |
| 10,873,929 B2* | 12/2020 | Kim | H04L 27/26132 |
| 10,917,825 B2* | 2/2021 | Peisa | H04B 7/0617 |
| 10,973,046 B2* | 4/2021 | Kim | H04W 74/0833 |
| 10,980,066 B2* | 4/2021 | Kim | H04W 72/0446 |
| 11,178,696 B2* | 11/2021 | Kim | H04W 74/008 |
| 11,228,990 B2* | 1/2022 | Jeon | H04W 52/50 |
| 11,234,136 B2* | 1/2022 | Li | H04L 27/2613 |
| 11,291,055 B2* | 3/2022 | Kim | H04W 74/008 |
| 11,395,343 B2* | 7/2022 | Vos | H04L 1/1861 |
| 11,412,550 B2* | 8/2022 | Jeon | H04W 80/02 |
| 2007/0253371 A1* | 11/2007 | Harper | H04W 8/082 370/331 |

(Continued)

*Primary Examiner* — Faiyazkhan Ghafoerkhan
(74) *Attorney, Agent, or Firm* — Loza & Loza, LLP

(57) ABSTRACT

A random access channel (RACH) procedure allows a user equipment (UE) to achieve synchronization with a network and obtain network resources and services from a scheduling entity. This disclosure provides various options for implementing a two-step RACH procedure that can support various UE behaviors in relation to using or not using a time symbol gap between a physical random access channel (PRACH) resource and a physical uplink control channel (PUCCH) resource.

26 Claims, 14 Drawing Sheets

(56) References Cited

U.S. PATENT DOCUMENTS

| | | | | |
|---|---|---|---|---|
| 2011/0122844 A1* | 5/2011 | Harper | H04W 28/06 | 370/328 |
| 2013/0042086 A1* | 2/2013 | Cardona | G06F 12/0284 | 711/E12.002 |
| 2013/0042237 A1* | 2/2013 | Cardona | G06F 12/0284 | 718/1 |
| 2013/0152075 A1* | 6/2013 | Cardona | G06F 9/54 | 718/1 |
| 2013/0329548 A1* | 12/2013 | Nakil | H04L 45/02 | 370/228 |
| 2015/0016350 A1* | 1/2015 | Moulsley | H04W 48/20 | 370/329 |
| 2017/0118658 A1* | 4/2017 | Hwang | H04W 76/10 | |
| 2017/0302419 A1* | 10/2017 | Liu | H04L 5/0098 | |
| 2018/0152317 A1* | 5/2018 | Chang | G06F 21/44 | |
| 2018/0191629 A1* | 7/2018 | Biederman | H04L 69/22 | |
| 2018/0332573 A1* | 11/2018 | Yu | H04W 72/0406 | |
| 2019/0042310 A1* | 2/2019 | Browne | G06F 1/3209 | |
| 2019/0044678 A1* | 2/2019 | Liu | H04L 5/0098 | |
| 2019/0052583 A1* | 2/2019 | Jain | H04L 49/9068 | |
| 2019/0098533 A1* | 3/2019 | Babaei | H04W 72/0413 | |
| 2019/0207868 A1* | 7/2019 | Chang | H04L 41/042 | |
| 2019/0230696 A1* | 7/2019 | Kim | H04L 5/0007 | |
| 2019/0320430 A1* | 10/2019 | Kim | H04L 27/2607 | |
| 2019/0387553 A1* | 12/2019 | Gong | H04W 74/006 | |
| 2020/0037345 A1* | 1/2020 | Ryoo | H04W 72/1284 | |
| 2020/0053797 A1* | 2/2020 | Basu Mallick | H04W 74/0808 | |
| 2020/0059967 A1* | 2/2020 | Kim | H04L 1/0026 | |
| 2020/0100299 A1* | 3/2020 | Loehr | H04W 80/02 | |
| 2020/0107235 A1* | 4/2020 | Peisa | H04W 36/0061 | |
| 2020/0252978 A1* | 8/2020 | Yi | H04L 5/0044 | |
| 2020/0260500 A1* | 8/2020 | Agiwal | H04W 74/004 | |
| 2020/0267772 A1* | 8/2020 | Jung | H04W 74/006 | |
| 2020/0267774 A1* | 8/2020 | Vos | H04W 74/0833 | |
| 2020/0296765 A1* | 9/2020 | Kim | H04W 56/001 | |
| 2020/0305197 A1* | 9/2020 | Kim | H04W 74/008 | |
| 2020/0314913 A1* | 10/2020 | Rastegardoost | H04W 74/04 | |
| 2020/0314917 A1* | 10/2020 | Jeon | H04W 74/08 | |
| 2020/0322108 A1* | 10/2020 | Liu | H04L 5/0091 | |
| 2020/0351801 A1* | 11/2020 | Jeon | H04W 52/48 | |
| 2020/0351955 A1* | 11/2020 | Jeon | H04L 1/1642 | |
| 2020/0359458 A1* | 11/2020 | Xiong | H04W 72/0453 | |
| 2021/0014694 A1* | 1/2021 | Li | H04W 80/08 | |
| 2021/0051672 A1* | 2/2021 | Rastegardoost | H04W 72/0493 | |
| 2021/0051707 A1* | 2/2021 | Rastegardoost | H04B 17/318 | |
| 2021/0100030 A1* | 4/2021 | Myung | H04W 74/0833 | |
| 2021/0136823 A1* | 5/2021 | Kim | H04W 74/0891 | |
| 2021/0185710 A1* | 6/2021 | Kim | H04L 5/0053 | |
| 2021/0321451 A1* | 10/2021 | Sun | H04W 8/24 | |
| 2021/0378030 A1* | 12/2021 | Wu | H04W 74/006 | |
| 2022/0159719 A1* | 5/2022 | Kim | H04W 74/006 | |

* cited by examiner

TWO-STEP RANDOM ACCESS PROCEDURE IN WIRELESS COMMUNICATION

PRIORITY CLAIM

This application claims priority to and the benefit of provisional patent application No. 63/007,031 filed in the United States Patent Office on Apr. 8, 2020, the entire content of which is incorporated herein by reference as if fully set forth below in its entirety and for all applicable purposes.

TECHNICAL FIELD

The technology discussed below relates generally to wireless communication systems, and more particularly, to a two-step random access procedure in wireless communication systems.

INTRODUCTION

Wireless communications systems are widely deployed to provide various types of communication content such as voice, video, packet data, messaging, broadcast, media streaming, and so on. These systems may be accessed by various types of devices adapted to facilitate wireless communications, where multiple devices share the available system resources (e.g., time, frequency, and power). In a communication network, a user equipment (UE) may use a process called a random access procedure to acquire uplink synchronization and obtain specified network identification for obtaining radio access communication with a network.

The third generation partnership project (3GPP) is an organization that develops telecommunication standards, for example, fifth-generation (5G) New Radio (NR). A 5G NR network can support wireless devices with different capabilities. For example, different UEs may have different capabilities in using a two-step random access procedure to gain access to a 5G NR wireless network.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the present disclosure relate to a random access channel (RACH) procedure that allows a user equipment (UE) to achieve synchronization with a wireless network and obtain network resources for various communication services. A two-step RACH procedure can support various UE behaviors in using a physical random access channel (PRACH) and a physical uplink control channel (PUCCH) during the two-step RACH procedure based on UE capability.

One aspect of the disclosure provides a method of wireless communication at a user equipment (UE). The UE receives random access channel (RACH) information for a RACH procedure from a scheduling entity. The RACH information indicates a plurality of resource pairs available for the RACH procedure, and each of the plurality of resource pairs comprises a physical random access channel (PRACH) resource and a physical uplink shared channel (PUSCH) resource. The UE selects a first resource pair of the plurality of resource pairs that satisfies a predetermined PRACH-to-PUSCH time gap. The UE transmit, to the scheduling entity, a first RACH message in the RACH procedure using the selected first resource pair. The first RACH message comprises at least a PRACH transmission.

Another aspect of the disclosure provides a user equipment (UE). The UE comprises a communication interface configured for wireless communication, a memory, and a processor operatively coupled with the communication interface and the memory. The processor and the memory are configured to receive, from a scheduling entity via the communication interface, random access channel (RACH) information for a RACH procedure. The RACH information indicates a plurality of resource pairs available for the RACH procedure. Each of the plurality of resource pairs comprises a physical random access channel (PRACH) resource and a physical uplink shared channel (PUSCH) resource. The processor and the memory are further configured to select a first resource pair of the plurality of resource pairs that satisfies a predetermined PRACH-to-PUSCH time gap. The processor and the memory are further configured to transmit, to the scheduling entity, a first RACH message in the RACH procedure using the selected first resource pair. The first RACH message comprises at least a PRACH transmission.

Another aspect of the disclosure provides a method of wireless communication at a scheduling entity. The method comprises transmitting, to a user equipment (UE), random access channel (RACH) information for a RACH procedure. The RACH information comprises resource information on a plurality of resources available for a physical random access channel (PRACH) and a physical uplink shared channel (PUSCH) used in the RACH procedure. The RACH information further comprises UE permission information for configuring the UE to transmit a first RACH message comprising a PRACH transmission in the RACH procedure without a PUSCH transmission. The method further comprises receiving the first RACH message in the RACH procedure from the UE.

Another aspect of the disclosure provides a scheduling entity. The scheduling entity comprises a communication interface configured to communicate with a user equipment (UE), a memory, and a processor operatively coupled with the communication interface and the memory. The processor and the memory are configured to transmit, to a user equipment (UE), random access channel (RACH) information for a RACH procedure. The RACH information comprises resource information on a plurality of resources available for a physical random access channel (PRACH) and a physical uplink shared channel (PUSCH) used in the RACH procedure. The RACH information further comprises UE permission information for configuring the UE to transmit a first RACH message comprising a PRACH transmission in the RACH procedure without a PUSCH transmission. The processor and the memory are further configured to receive the first RACH message in the RACH procedure from the UE.

These and other aspects of the invention will become more fully understood upon a review of the detailed description, which follows. Other aspects, features, and implementations will become apparent to those of ordinary skill in the art, upon reviewing the following description of specific examples in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while examples may be discussed below as device, system, or method examples, it should be understood that such examples can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, various aspects and/or uses may come about via integrated chips and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure relate to a random access channel (RACH) procedure that allows a user equipment (UE) to achieve synchronization with a wireless network and obtain network resources for various communication services. The disclosure provides various options for implementing a two-step RACH procedure that can support various UE behaviors in using a physical random access channel (PRACH) and a physical uplink control channel (PUCCH) during the two-step RACH procedure based on UE capability.

Figure 1:
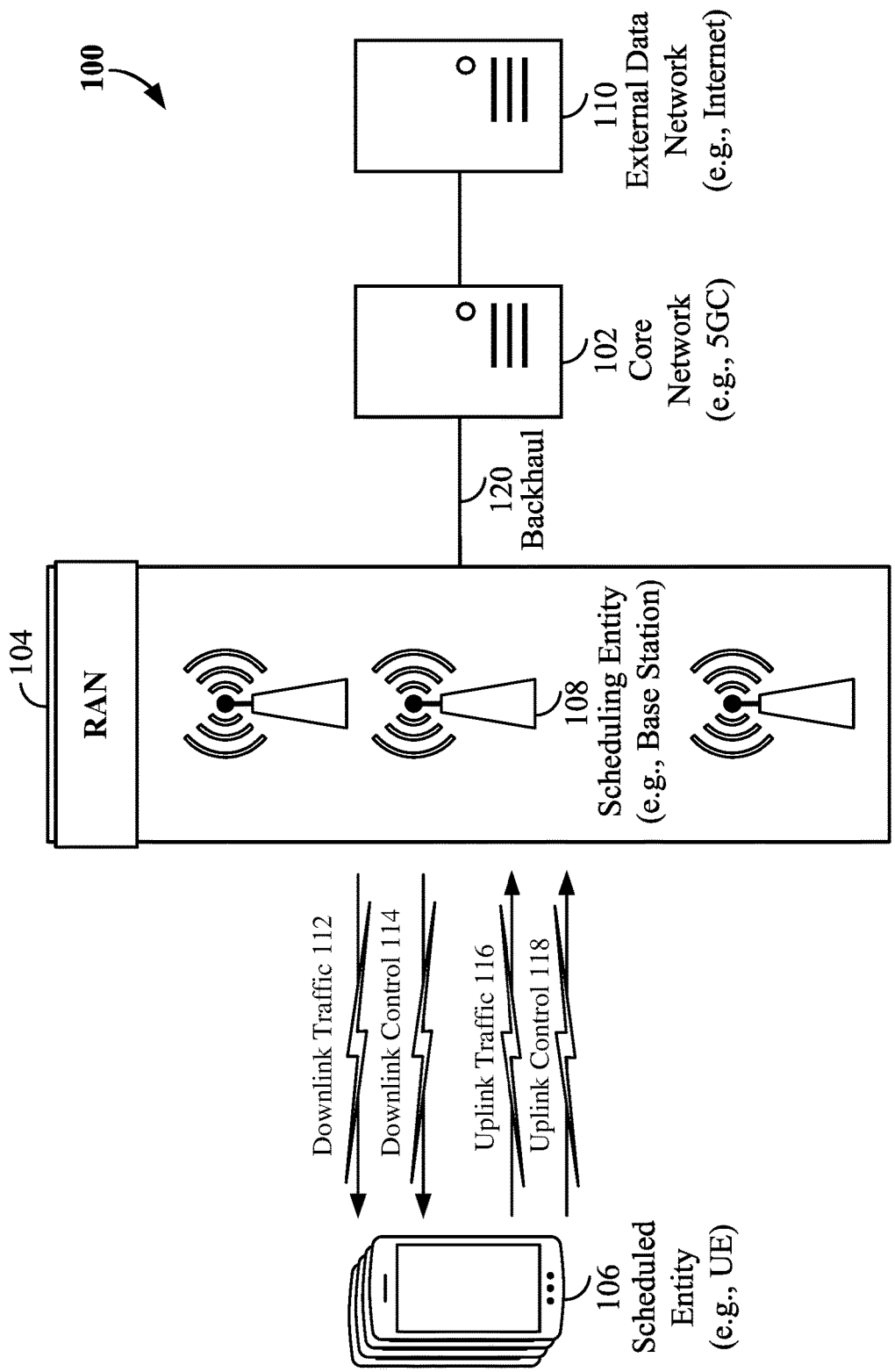
FIG. 1 is a schematic illustration of a wireless communication system according to some aspects of the present disclosure.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
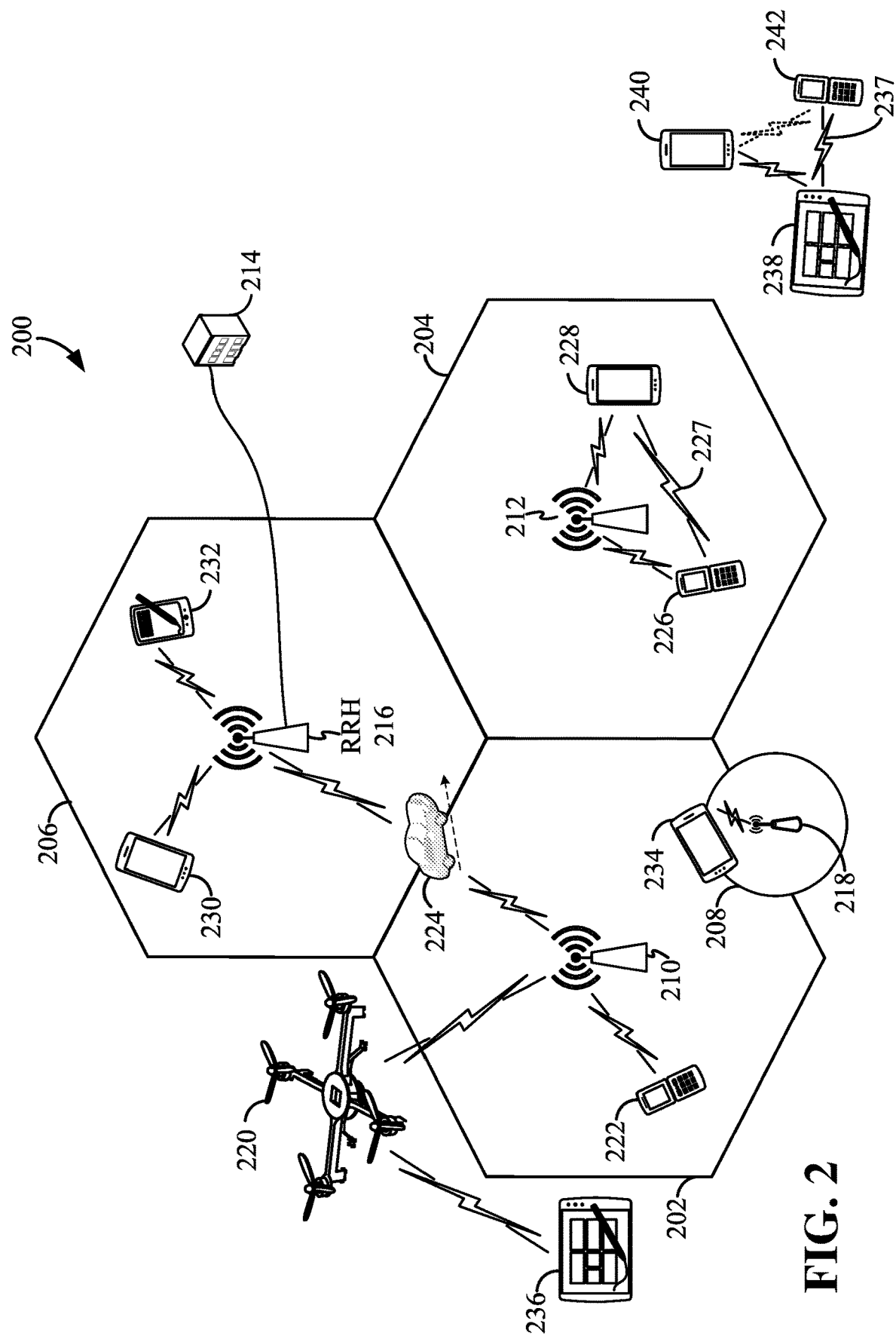
FIG. 2 is a conceptual illustration of an example of a radio access network according to some aspects of the present disclosure.

FIG. 2 is a conceptual illustration of an example of a radio access network (RAN) 200 according to some aspects of the present disclosure. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
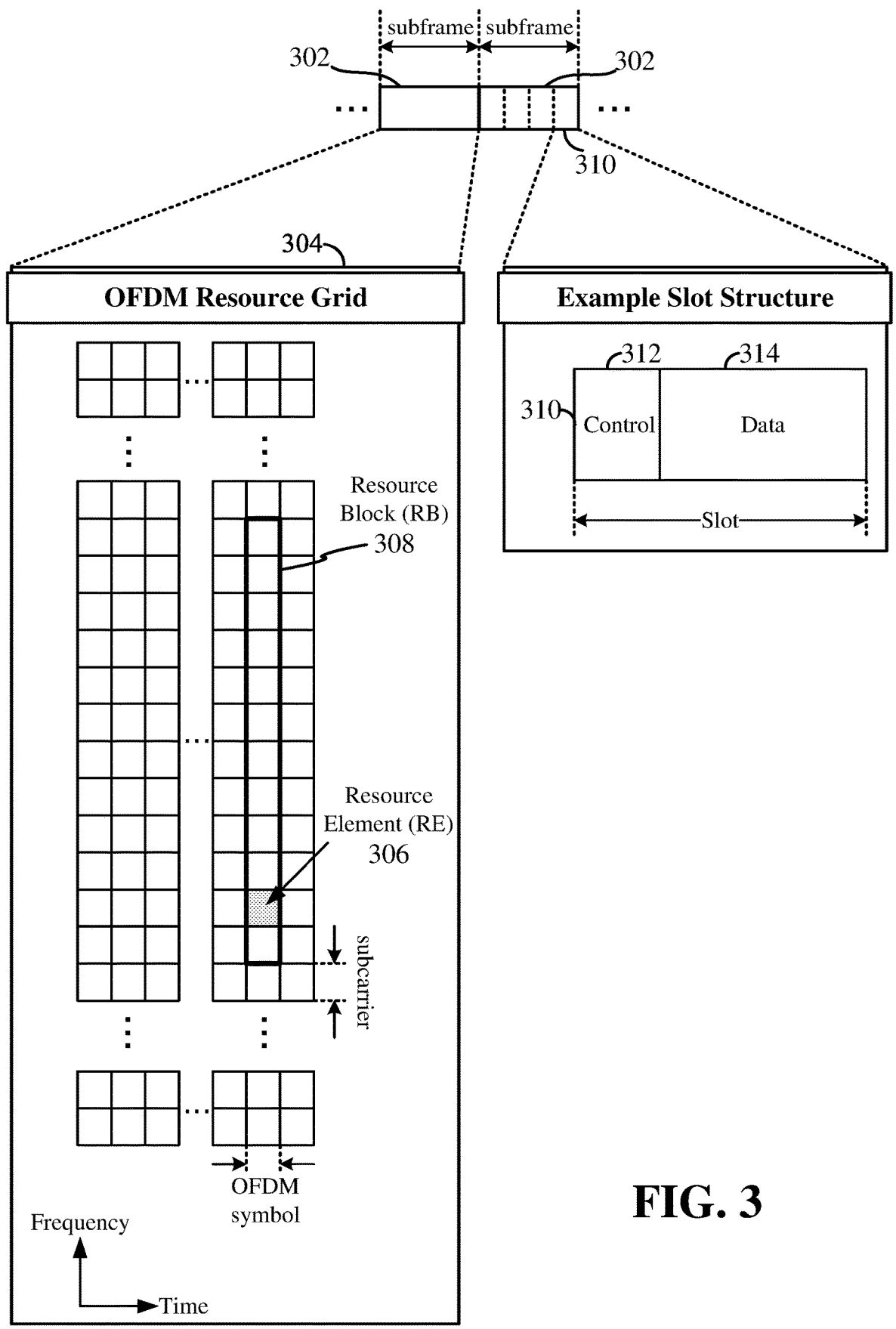
FIG. 3 is a schematic illustration of an organization of wireless resources in an air interface utilizing orthogonal frequency divisional multiplexing (OFDM) according to some aspects of the present disclosure.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESETO), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In some examples, the DL and/or UL REs may be allocated to carry RACH messages or signaling for a 2-step RACH procedure described in more detail below.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In some aspects, a UE can gain initial access to a cell (e.g., RAN 200) using an access procedure, for example, a two-step RACH procedure. A base station of the RAN 200 may provide system information (SI) characterizing the cell. This system information may be provided utilizing minimum system information (MSI), and other system information (OSI). The MSI may be periodically broadcast over the cell to provide the most basic information used for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI). For example, a UE can read the system information for cell camping when it is powered on, and for cell selection and re-selection when it is in an RRC IDLE mode. OSI may include any system information (SI) that is not broadcast in the MSI. In some examples, the PDSCH may carry a plurality of SIBs, not limited to SIB1, discussed above. Here, the OSI may be provided in these SIBs, e.g., SIB2 and above.

When OSI is required by a UE, before the UE sends the OSI request, the UE needs to know whether OSI is available in the cell and whether it is broadcast or not. A UE in RRC IDLE or RRC INACTIVE mode may request the OSI without a state transition. For a UE in RRC CONNECTED mode, dedicated RRC signaling can be used for the request and delivery of the OSI. The OSI may be broadcast at configurable periodicity and for a certain duration. The network may broadcast or deliver the OSI through dedicated UE-specific RRC signaling. When a UE is powered on, it performs a cell search procedure and decodes the PSS and SSS information to get the physical cell ID. Then, the UE can scan for the MIB at set Global Synchronization Channel Number(s) (GSCN) and acquire a suitable SS/PBCH block that can provide the MIB.

Figure 4:
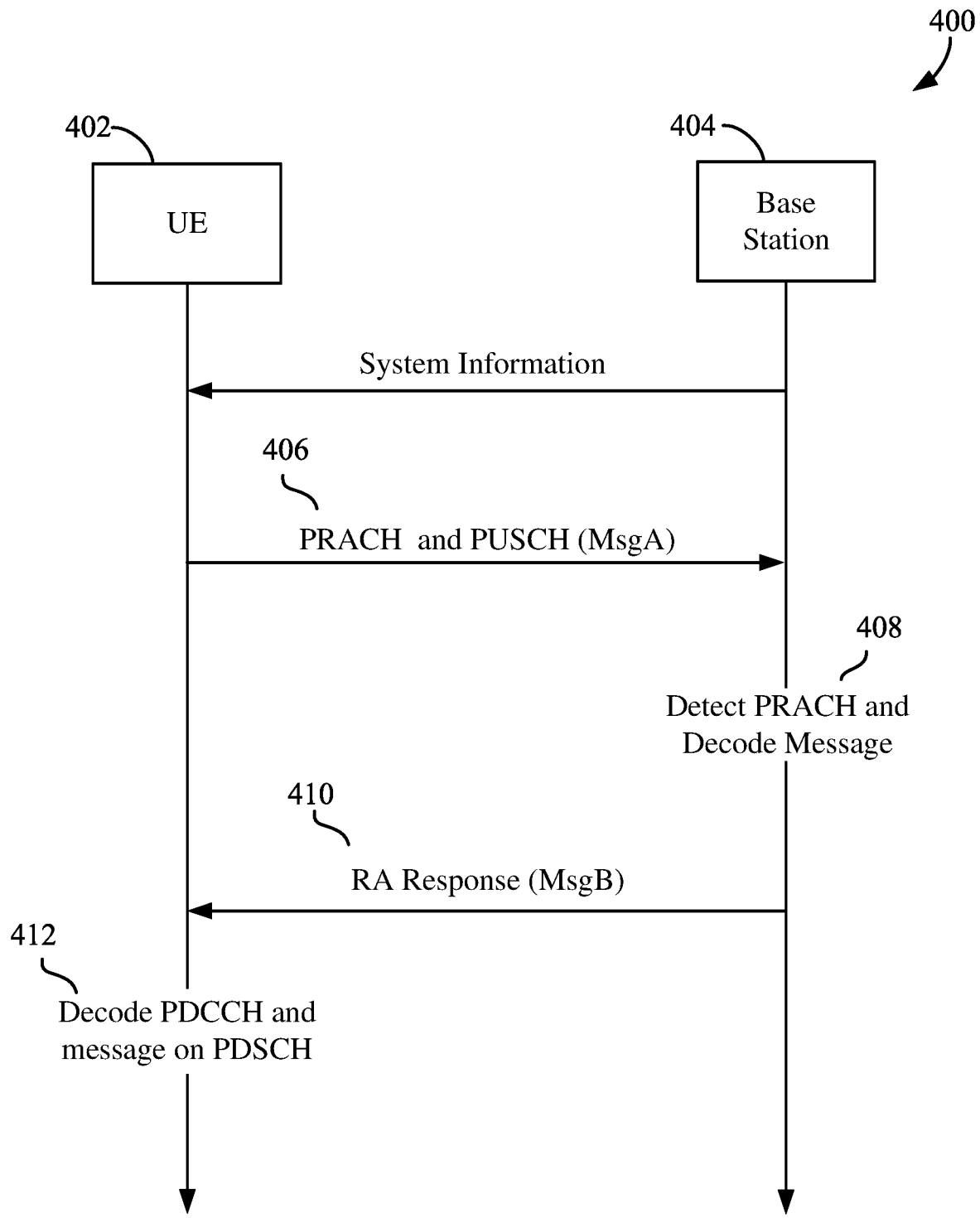
FIG. 4 is a diagram illustrating an example of a two-step random access procedure according to some aspects of the disclosure.

FIG. 4 is a diagram illustrating an example of a two-step RACH procedure 400 according to some aspects of the disclosure. This two-step RACH procedure 400 may be implemented as a contention-based RACH (CBRA) procedure or contention-free RACH (CFRA) procedure. In a CBRA procedure, a UE 402 may share a spectrum with other wireless devices. The UE needs to determine whether or not the spectrum is free before accessing it. In a CFRA procedure, the network (e.g., base station 404) may allocate different PRACH preambles to different UEs to avoid PRACH collision.

In one aspect, the UE 402 can communicate with the base station 404 using a licensed or shared/unlicensed spectrum. When using a shared or unlicensed spectrum, the UE may use a contention scheme, for example, listen-before-talk (LBT) procedure, to determine whether or not another device is using the same spectrum before the UE can transmit a RACH message, for example, in a CBRA procedure. It should be understood that aspects of the present disclosure can be employed between a scheduled entity (e.g., UE 402) and a scheduling entity (e.g., base station 404 or gNB).

As shown, the UE 402 transmits a first RACH message (e.g., MsgA 406) to the base station 404. The MsgA 406 transmission may include PRACH and PUSCH transmissions, respectively. The PRACH transmission may include a PRACH preamble sequence. In one example of a CBRA procedure, the UE may select a PRACH preamble sequence from a set of available preamble sequences. In an example of a CFRA procedure, the base station 404 may assign a PRACH preamble to the UE. In some examples, the PUSCH transmission may include a radio network temporary identifier (RNTI) and/or other information. In some examples, the PUSCH may include information associated with a cell RNTI (C-RNTI) that is specific to the UE. The base station 404 may use the C-RNTI in subsequent transmissions addressed to the UE 402. For example, the base station may scramble a PDCCH destined for the UE with the C-RNTI specific to the UE.

In some aspects of the disclosure, the PRACH transmission and PUSCH transmission may not be in the same slot. In one aspect, a network (e.g., base station 404) may configure a minimum time domain gap between the PRACH and PUSCH transmissions for a licensed band (e.g., 2 symbols for 15 KHz and 30 KHz bands, 4 symbols for 60 KHz and 120 KHz bands). In another aspect, the network may configure no time gap between the PRACH and PUSCH transmissions for an unlicensed band. In some aspects, no time gap between the PRACH and PUSCH transmissions can mean that the time gap between the PRACH and PUSCH transmissions is less than one time domain symbol (e.g., OFDM symbol). The ability of a UE to perform PRACH and PUSCH transmissions with no time gap in between is particularly useful in a CBRA procedure. For example, the UE 402 may perform a listen-before-talk (LBT) procedure to determine whether or not another device is using the same spectrum before the UE can transmit a RACH message. The UE can use the same contention-based channel access attempt (e.g., LBT procedure) in order to transmit the PRACH and PUSCH after successfully gaining channel access because there is no time gap between the PRACH and PUSCH transmissions. However, if a time gap is present between the PRACH and PUSCH transmissions, the UE needs to perform separate channel access attempts for the PRACH and PUSCH transmissions. In this case, the UE may lose the channel in the second channel access attempt even if the UE has succeeded in the first channel access attempt.

When the base station 404 receives MsgA 406, the base station 404 detects the PRACH preamble at step 408. If MsgA 406 received by the base station 404 includes a PUSCH transmission, the base station 404 can decode the PUSCH at step 408. In some cases, the UE may fail to transmit PUSCH due to, for example, invalid PUSCH resources (e.g., PUSCH occasions) and/or listen-before-talk (LTB) failure in shared or unlicensed spectrum applications. In response to MsgA 406, the base station 404 can send a second RACH message or random access (RA) response (e.g., MsgB 410) to the UE 402 in this two-step RACH procedure. MsgB 410 may include, for example, a random-access response (RAR) in a PDSCH. In a contention-based RACH example, MsgB 410 may also include a contention resolution message in the PDSCH.

The UE may monitor the PDCCH or PDSCH for the RAR that may be identified by a radio network temporary identifier (RNTI). In one example, the RNTI may be an MsgB-RNTI that can be determined or computed based on the communication resources (e.g., PRACH occasions) used by the UE to transmit MsgA 406. PRACH occasions include time-frequency resources allocated by the network (e.g., base station 404) for transmitting the PRACH. In another example, the RNTI may be the C-RNTI when C-RNTI information (e.g., the C-RNTI or information from which the C-RNTI may be derived) is included in the MsgA PUSCH transmission. For example, if the base station receives the C-RNTI information in MsgA 406, the PDCCH in MsgB 410 may include CRC bits that are scrambled with the C-RNTI specific to the UE. MsgB 410 may further include a PDSCH transmission. The PDSCH transmission may include UE-specific content or message, such as an indication confirming the PRACH preamble, a timing advance value, a back-off indicator, a contention resolution message, a transmit power control (TPC) command, an uplink or downlink resource grant, and/or other information. On receipt of the second message or RA response (MsgB 410), the UE 402 attempts to decode the PDCCH and the PDSCH at step 412.

In one example, the UE 402 and base station 404 may generate a device-specific network identifier associated with the UE (e.g., C-RNTI) based on an identity of the UE (UE ID). For example, the UE and base station may utilize a predetermined number of bits of the UE identity (UE ID) as the device-specific network identifier or may derive the device-specific network identifier from the predetermined number of bits of the UE ID. Referring again to FIG. 4, when the UE 402 includes the UE ID, or at least a portion of the UE ID, in the first RACH message 406, the base station 404 can determine from the UE ID a device-specific network identifier (e.g., C-RNTI) in the same manner that the UE 402 determines a device-specific network identifier (e.g., C-RNTI) from its UE ID. In this way, both entities may be aware of the device-specific network identifier to be associated with the UE 402.

In another example, the UE 402 and base station 404 can generate the device-specific network identifier (e.g., C-RNTI) based on one or more resource parameters associated with the resources utilized to send the first RACH message 406. For example, the resource parameters associated with the resources utilized to send MsgA 406 may include the transmission time, the frequency, the preamble sequence (e.g., the root, shifts), etc. The UE 402 and base station 404 may utilize one or more of these resource parameters to generate the device-specific network identifier (e.g., C-RNTI) for use by the UE 402 as part of the two-step RACH procedure.

In another example, the UE 402 and base station 404 can generate the device-specific network identifier (e.g., C-RNTI) based on a combination of at least a portion of the UE ID and one or more resource parameters associated with the resources selected for sending the first RACH message 406. For instance, the UE-specific network identifier may be generated by mapping at least a portion of the UE ID and one or more resource parameters associated with the resources selected for sending the first RACH message 406 to the device-specific network identifier. In this example, the resources for sending the first RACH message 406 may be selected randomly, similar to the example described with reference to FIG. 4. Alternatively, the one or more resource parameters for transmitting the first RACH message 406 may be selected based on a predetermined number of bits from the UE ID. Additional bits of the UE ID may also be transmitted in the first RACH message 406. Utilizing both the UE ID payload and the one or more resource parameters associated with the resources utilized for sending the first RACH message 406, the UE 402 and base station 404 can derive the device-specific network identifier that is unique to the UE 402.

When the above-described two-step RACH procedure is used with unlicensed or shared spectrum, there is a possibility that the PRACH is transmitted while the PUSCH of MsgA is not transmitted due to, for example, invalid PUSCH resources and/or listen-before-talk (LBT) failure. When a UE (e.g., UE 402) does not transmit or fails to transmit MsgA PUSCH including C-RNTI information, the base station (e.g., base station 404) may not be able to obtain the C-RNTI of the UE in the MsgA transmission. As a result, the base station may transmit a random access response (RAR) in the PDCCH of MsgB with a CRC that is not scrambled by the C-RNTI of the UE.

However, the above-described scenario may not apply in a two-step CFRA procedure that may be used in a 5G NR network. In a two-step CFRA procedure, the network (e.g., base station 404) may allocate different PRACH preambles to different UEs to avoid PRACH collision. In this case, even if the UE fails to transmit the MsgA PUSCH, there is still the possibility that the base station (e.g., gNB) can determine the identity of the UE that has successfully transmitted only the PRACH preamble that is known to be associated with the UE. As a result, the base station can still transmit a random access response scrambled by the C-RNTI of the UE even when the UE has failed to transmit the C-RNTI information in MsgA.

Some aspects of the present disclosure provide various options for configuring UE behavior in a two-step RACH procedure that support flexible time gap configurations between PRACH and PUSCH transmissions. In some aspects, a time gap between the PRACH and PUSCH transmissions may be one or more time domain symbols. In some aspects, the PRACH and PUSCH transmissions have no time gap therebetween. In this case, the time gap between the PRACH and PUSCH transmissions can be less than one time domain symbol (e.g., OFDM symbol shown in FIG. 3).

In one aspect of the disclosure, the network (e.g., RAN 200) may configure multiple PRACH-PUSCH resource pairs with different time gaps between the PRACH and PUSCH transmissions. A PRACH-PUSCH resource pair includes a PRACH resource for PRACH and a corresponding PUSCH resource for PUSCH with or without a time gap between the PRACH resource and PUSCH resource.

Figure 5:
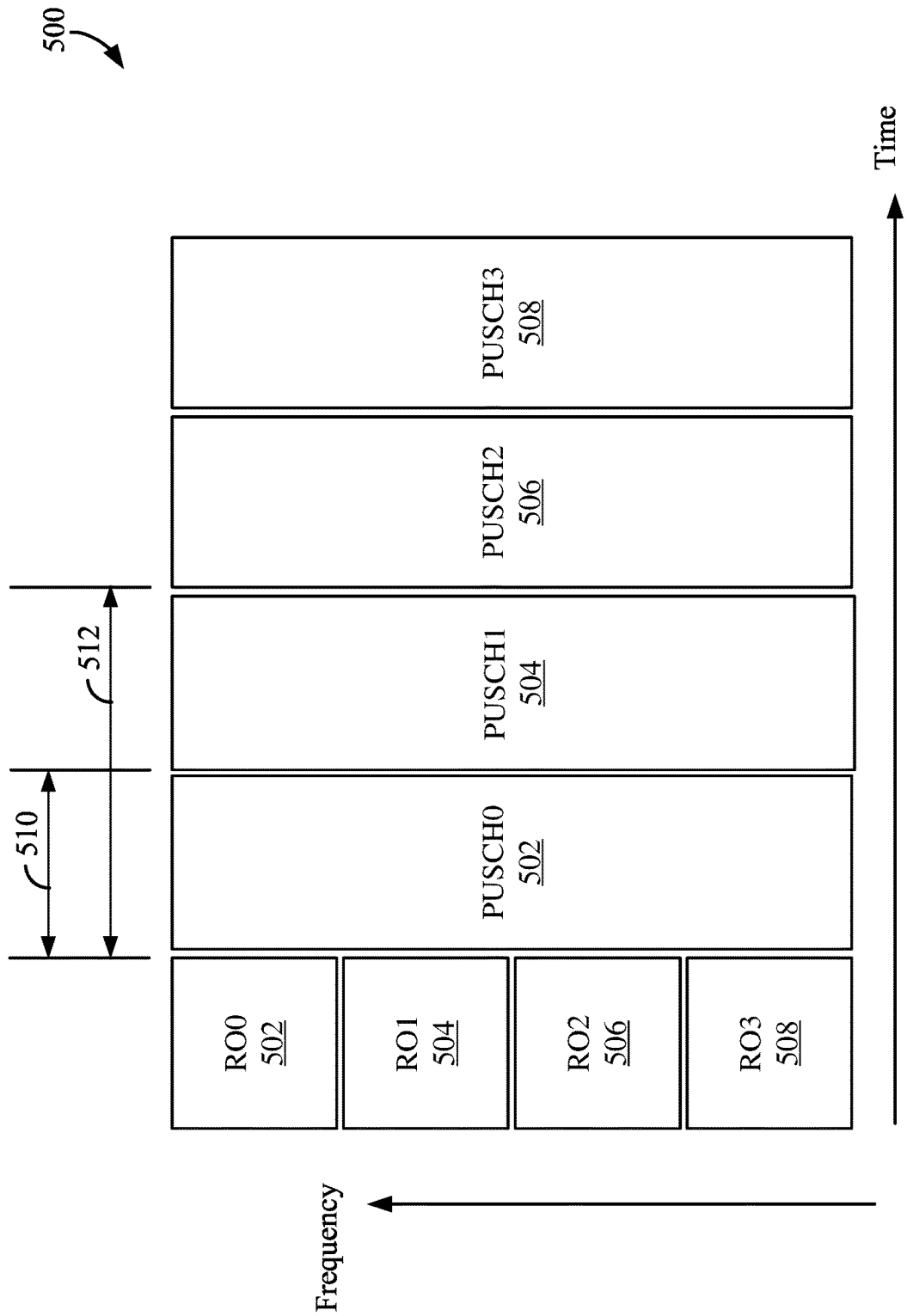
FIG. 5 is a diagram illustrating an example of a physical random access channel (PRACH) and a physical uplink control channel (PUCCH) resource configuration according to some aspects of the disclosure.

FIG. 5 is a diagram illustrating an exemplary PRACH-PUSCH resource configuration according to some aspects of the disclosure. Four PRACH-PUSCH resource pairs 500 are illustrated in time and frequency domains in FIG. 5. While only time and frequency domains are illustrated, additional domains such as a spatial domain are also contemplated in this disclosure. In FIG. 5, a first PRACH-PUSCH resource pair 502 includes a first PRACH occasion (RO0) and its corresponding PUSCH0 resource with no time gap (e.g., less than one time domain symbol) between the transmissions in the time domain. Three other PRACH-PUSCH resource pairs having different time gaps are also illustrated in FIG. 5. For example, a second PRACH-PUSCH pair 504 includes a second PRACH occasion (RO1) and its corresponding PUSCH1 resource. A third PRACH-PUSCH pair 506 includes a third PRACH occasion (RO2) and its corresponding PUSCH2 resource. A fourth PRACH-PUSCH pair 508 includes a fourth PRACH occasion (RO3) and its corresponding PUSCH3 resource. The resource allocation of these PRACH and PUSCH resources are only illustrative examples, and other resource allocations are contemplated in this disclosure to provide different time gaps between PRACH and PUSCH transmissions for facilitating a two-step RACH procedure. In this disclosure, no time gap between PRACH and PUSCH resources means that no time domain symbol or less than one time domain symbol is located between the PRACH resource and PUSCH resource in the time domain.

The above described PRACH-PUSCH resource pairs provide different and flexible time gaps or delays between PRACH and PUSCH transmissions that can be used by UEs with different capabilities. Therefore, a UE may choose the PRACH-PUSCH resource pair that provides a sufficient time gap based on the UE's capability. For example, a low or reduced capability UE may need a certain time gap between PRACH and PUSCH transmissions. In that case, the UE may choose from among the RO1-PUSCH1, RO2-PUSCH2, and RO3-PUSCH3 resource pairs that provide different time gaps between the PRACH and PUSCH resources. Therefore, the UE may select a PRACH-PUSCH resource pair with a time gap that is equal to or greater than the minimum time gap (e.g., one or more time domain symbols) needed based on the UE's capability. In another example, a high capability UE may support no time gap (e.g., less than one time domain symbol) between PRACH and PUSCH transmissions. In that case, the UE can choose any of the RO0-PUSCH0, RO1-PUSCH1, RO2-PUSCH2, and RO3-PUSCH3 resource pairs. For example, the UE can select the RO0-PUSCH0 resource pair that has no time gap between the PRACH and PUSCH transmissions.

CBRA Procedure

Figure 6:
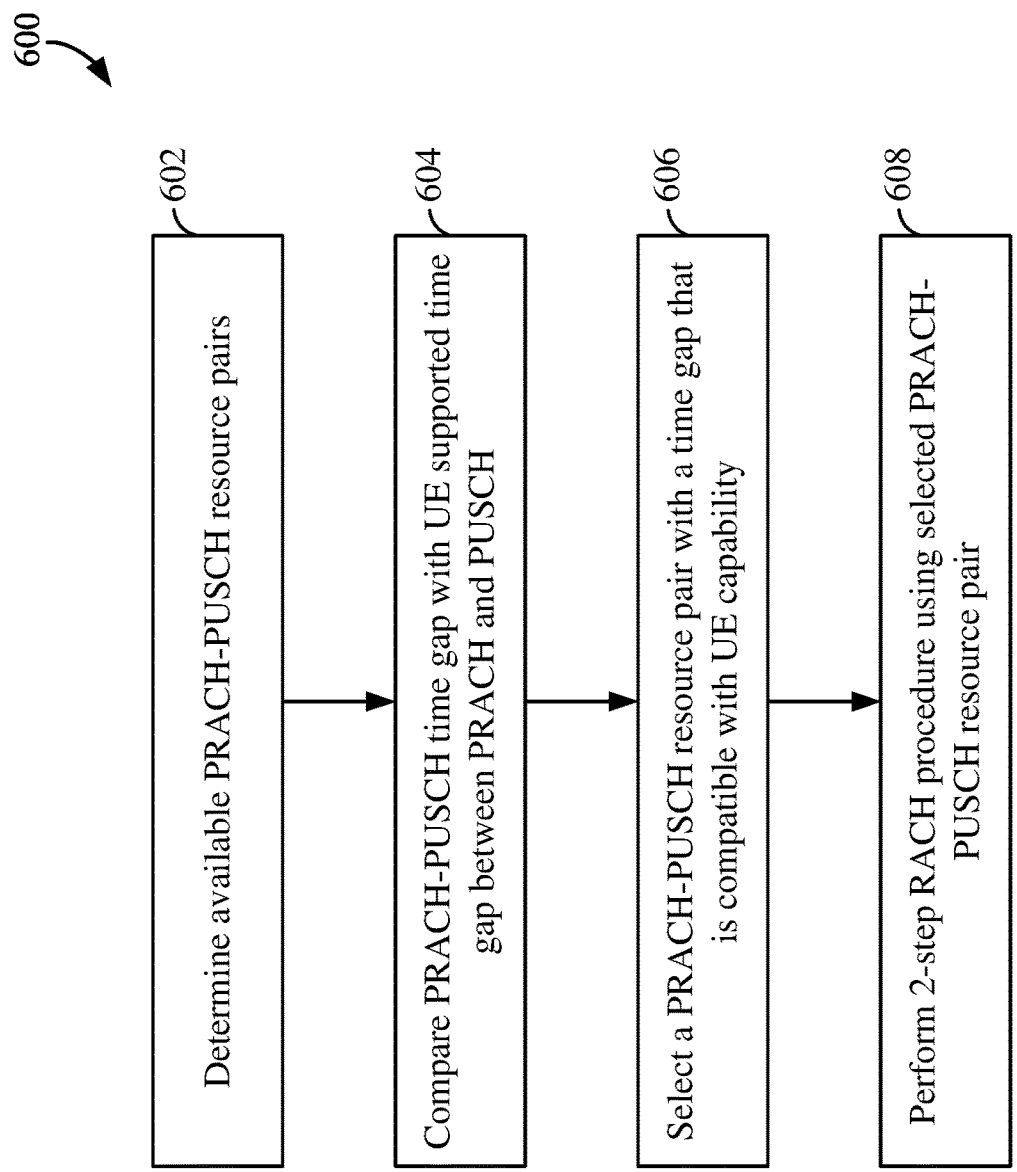
FIG. 6 is a flow chart illustrating a first method for performing a two-step RACH procedure in accordance with some aspects of the disclosure.

FIG. 6 is a flow chart illustrating a method for performing a two-step RACH procedure 600 in accordance with some aspects of the present disclosure. In some examples, the UE 402 can carry out the method 600 to gain access to a network or cell. In some examples, the method 600 may be carried out by any suitable apparatus or means for carrying out the functions or algorithms described below. In some examples, the method 600 may be used in a contention-based RACH (CBRA) procedure.

At block 602, a UE determines available PRACH-PUSCH resource pairs configured by a network. In one example, the available PRACH-PUSCH resource pairs may be similar to the PRACH-PUSCH resource pairs described above in relation to FIG. 5. The UE may determine the available PRACH-PUSCH resource pairs based on system information (e.g., MIB, OSI, etc.) broadcasted by the network (e.g., base station 404) or from radio resource control (RRC) signaling.

At block 604, the UE compares the time gaps between PRACH and PUSCH resources of the available PRACH-PUSCH resource pairs with the PRACH-PUSCH time gap supported by the UE. For example, the time gaps (e.g., time gaps 510 and 512) between different PRACH-PUSCH resource pairs (RO1-PUSCH1 and RO2-PUSCH2) are different in FIG. 5. In some aspects, the PRACH-PUSCH time gap supported by the UE may be a minimum time gap based on the capability of the UE (e.g., UE processing capability). In one example, a low or reduced capability UE may need a PRACH-PUSCH time gap of one or more time domain symbols (e.g., OFDM symbols) between PRACH and PUSCH transmissions. In another example, a high capability UE may not need any time gap (e.g., less than one time domain symbol) between PRACH and PUSCH transmissions.

At block 606, the UE can select a PRACH-PUSCH resource pair to perform a two-step RACH procedure based on the comparison at block 604. The selected PRACH-PUSCH resource pair has a PRACH-PUSCH time gap that is compatible with the capability of the UE. For example, the UE can select a PRACH-PUSCH resource pair with a PRACH-PUSCH time gap that is at least equal to a minimum PRACH-PUSCH time gap requirement of the UE.

At block 608, the UE can perform a two-step RACH procedure using the selected PRACH-PUSCH resource pair. For example, the UE may transmit a first RACH message (e.g., MsgA 406) including PRACH and PUSCH transmissions. However, if no available PRACH-PUSCH resource pair has a time gap that can meet the time gap requirement of the UE, the UE can forego or omit performing the two-step RACH procedure, for example, for CBRA.

In some aspects of the disclosure, a UE can transmit only the PRACH preamble without a PUSCH transmission during a two-step RACH procedure when none of the configured PRACH-PUSCH resource pairs provides a sufficient PRACH-PUSCH time gap. For example, the PRACH-PUSCH time gap of each available PRACH-PUSCH resource pair is less than a minimum time gap needed by the UE to prepare the PUSCH transmission after the PRACH transmission. In this case, the UE may transmit the PRACH portion only in a first RACH message (e.g., MsgA 406) in the two-step RACH procedure (e.g., RACH procedure 400). From the perspective of the network (e.g., base station 404), this scenario is similar to the UE failed LBT for the PUSCH transmission, or the PUSCH transmission is not detected by the network. In one aspect, the two-step RACH procedure can handle this scenario (i.e., PRACH transmission detected but PUSCH transmission not detected) by sending a MsgB-RNTI based MsgB to the UE. In this case, UE can start a two-step RACH procedure even when all PRACH-PUSCH resource pairs for a particular synchronization signal block (SSB) of a selected beam do not have enough time gap between PRACH and PUSCH resources for the UE based on UE capability.

In some aspects, one or more of available PRACH-PUSCH resource pairs may have a sufficient PRACH-PUSCH gap for the selected SSB. However, the PRACH and PUSCH transmissions may be undesirably far apart in the time domain. In this case, the UE may still select the PRACH-PUSCH resource pair for a two-step RACH procedure, but the first RACH message only includes the PRACH transmission (e.g., preamble) without the PUSCH transmission. Therefore, the UE does not need to wait for the PUSCH transmission occasion and needs not fall back to a four-step RACH procedure that will have higher latency than the two-step RACH procedure. In the four-step RACH procedure, the PRACH and PUSCH transmissions are separated by a RACH response from the network.

CFRA Procedure

Figure 7:
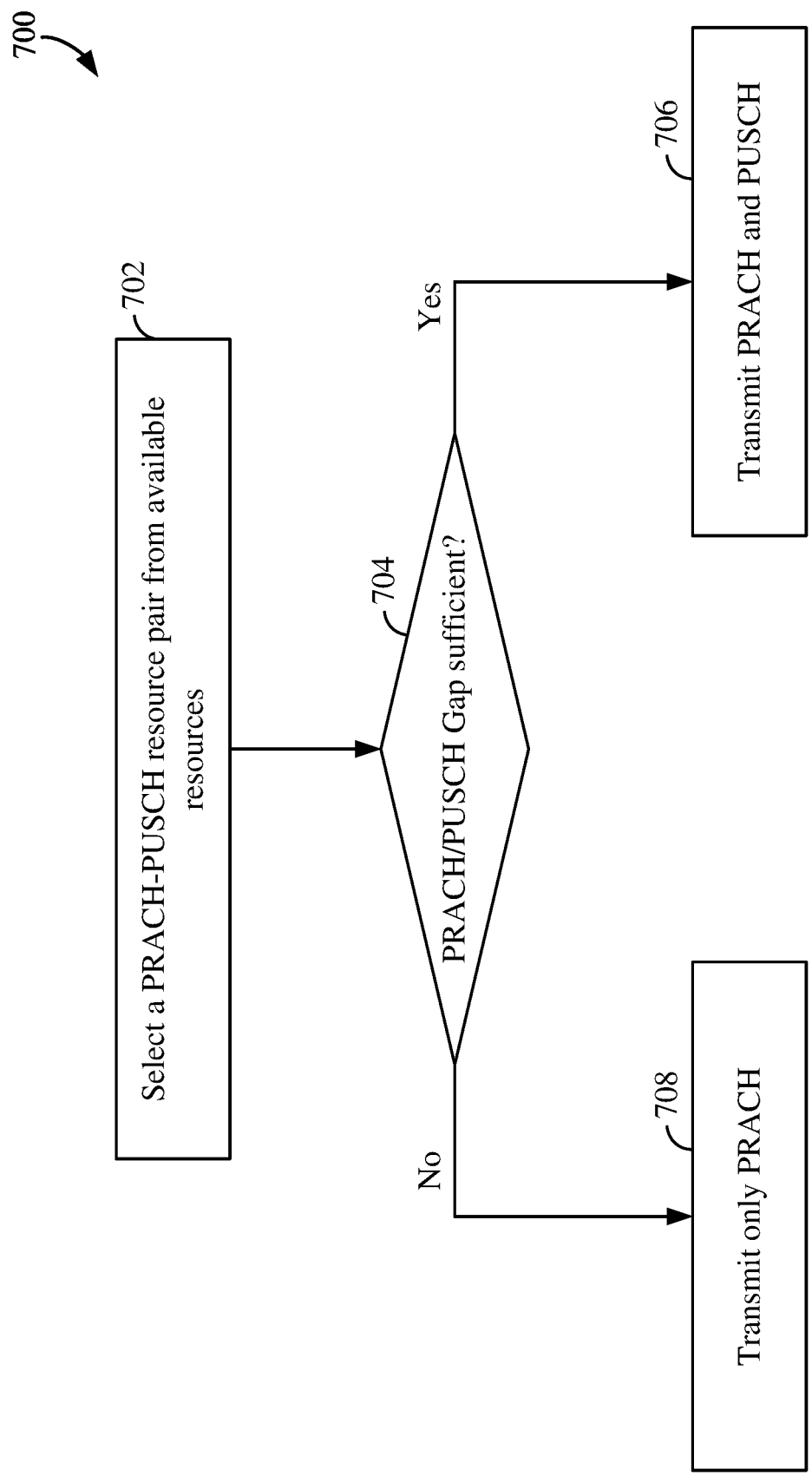
FIG. 7 is a flow chart illustrating a second method for performing a two-step RACH procedure in accordance with some aspects of the disclosure.

FIG. 7 is a flow chart illustrating another method 700 for performing a two-step RACH procedure in accordance with some aspects of the disclosure. In some examples, the method 700 may be carried out by the UE 402 illustrated in FIG. 4. In some examples, the method 700 may be carried out by any suitable apparatus or means for carrying out the functions or algorithms described below. In some examples, the method 700 may be used by a UE for a contention free RACH procedure (CFRA).

At block 702, a UE selects a PRACH-PUSCH resource pair from available RACH resources. In one example, the available PRACH-PUSCH resources may be similar to the PRACH-PUSCH resource pairs described above in relation to FIG. 5. For example, the RO0-PUSCH0 resource pair has no time symbol gap (e.g., a time gap less than 1 time symbol) in between the PRACH and PUSCH resources, but other RO-PUSCH resource pairs can have increasingly longer time gaps between PRACH and PUSCH resources. If the UE is a low or reduced capability UE that needs a certain time gap (e.g., one or more time domain symbols) between PRACH and PUSCH transmissions, the UE may choose the resource pairs RO1-PUSCH1, RO2-PUSCH2, or RO3-PUSCH3 for the PRACH and PUSCH transmissions during a two-step RACH procedure. In this case, the UE may perform separate LBTs for the PRACH and PUSCH transmissions, respectively. If the UE is a high or full capability UE that can support no time gap (e.g., less than one time domain symbol) between PRACH and PUSCH transmissions, the UE may choose any of the available PRACH-PUSCH resource pairs (e.g., RO0-PUSCH0, RO1-PUSCH1, RO2-PUSCH2, or RO3-PUSCH3 resource pairs in FIG. 5). In one aspect, if the UE selects the RO0-PUSCH0 resource pair, the UE can use a single LBT process for both PRACH and PUSCH transmissions because there is no symbol time gap between the PRACH and PUSCH resources.

At decision block 704, if the UE can select a PRACH-PUSCH resource pair that has a sufficient time gap, the method proceeds to block 706; otherwise, the method proceeds to block 708. In one aspect, a time gap is sufficient if it is larger than a predetermined value or time duration (e.g., one or more time domain symbols) that is needed by the UE to prepare for the PUSCH transmission after the PRACH transmission. The time gap may depend on the UE capability (e.g., processing power).

At block 706, the selected PRACH-PUSCH resource pair has a sufficient time gap between the PRACH and PUSCH resources, and the UE can transmit a first RACH message (MsgA) that includes both the PRACH and PUSCH transmissions in a two-step RACH procedure. At block 708, the selected PRACH-PUSCH resource pair does not have a sufficient time gap, and the UE can transmit a first RACH message (MsgA) that includes only the PRACH transmission in a two-step RACH procedure.

Figure 8:
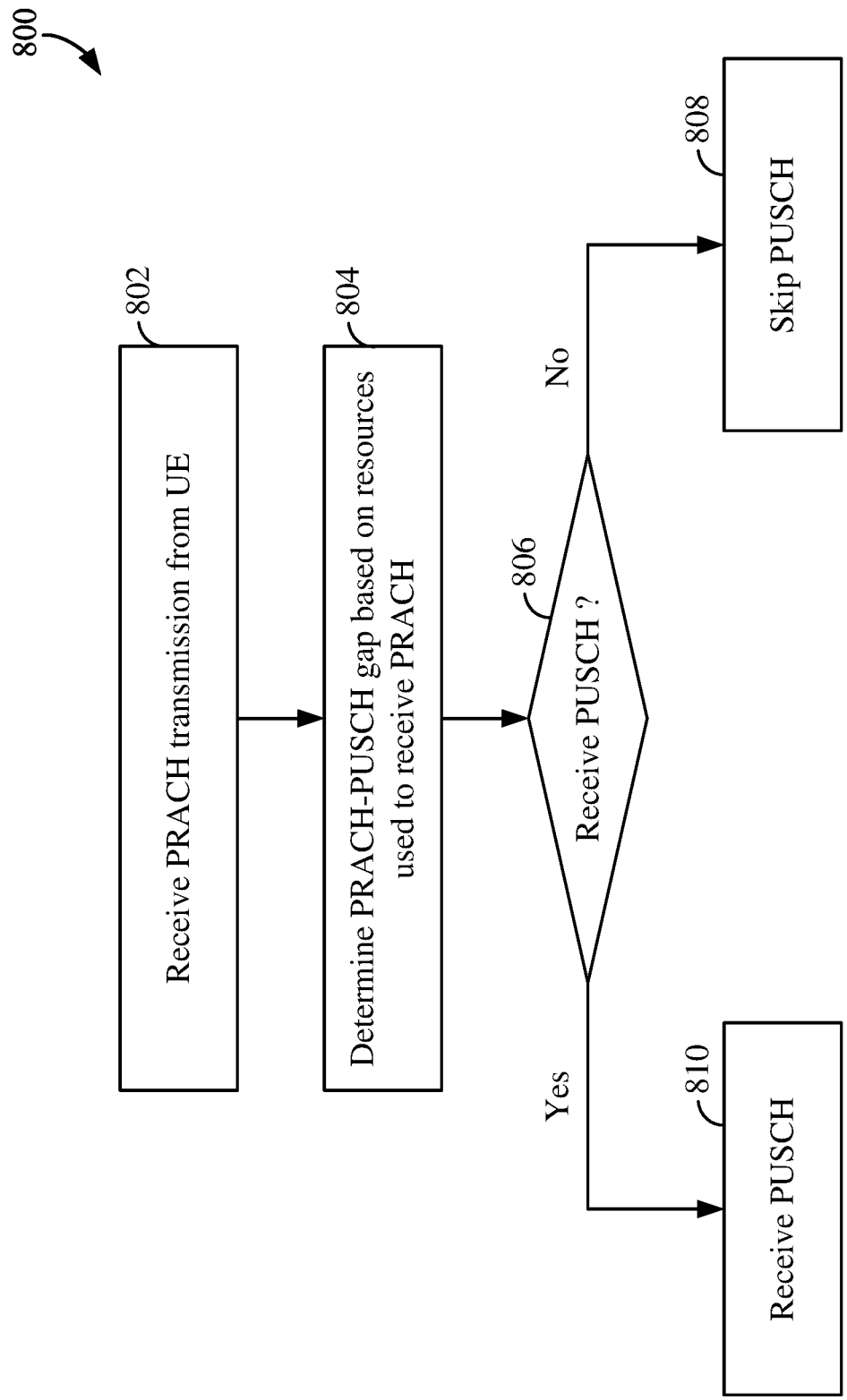
FIG. 8 is a flow chart illustrating a method for omitting PUSCH reception during a two-step RACH procedure according to some aspects of the disclosure.

FIG. 8 is a flow chart illustrating a method 800 for determining whether or not to omit PUSCH reception during a two-step contention-free RACH (CFRA) procedure in accordance with some aspects of the disclosure. At block 802, a scheduling entity receives a PRACH transmission of MsgA from a UE. At block 804, the scheduling entity determines the PRACH-PUSCH time gap based on the resources used to receive the PRACH. In a CFRA procedure, the scheduling entity (e.g., gNB or base station) is aware of the dedicated PRACH-PUSCH resource pair used for receiving the PRACH transmission as well as the UE capability. At decision block 806, the scheduling entity determines whether or not to receive the PUSCH associated with the received PRACH.

At block 808, the scheduling entity determines to skip the PUSCH. For example, when the UE transmits the PRACH only for a selected PRACH-PUSCH resource pair with a PRACH-PUSCH gap not supported by the UE, the scheduling entity does not need to perform blind detection on the omitted PUSCH transmission because the scheduling entity can determine that the UE has transmitted a first RACH message (MsgA) without the associated PUSCH transmission based on the selected PRACH-PUSCH resource pair and known UE capability. At block 810, the scheduling entity determines to receive the PUSCH when the UE transmits the PRACH using a PRACH-PUSCH resource pair with a sufficient PRACH-PUSCH gap based on UE capability.

Figure 9:
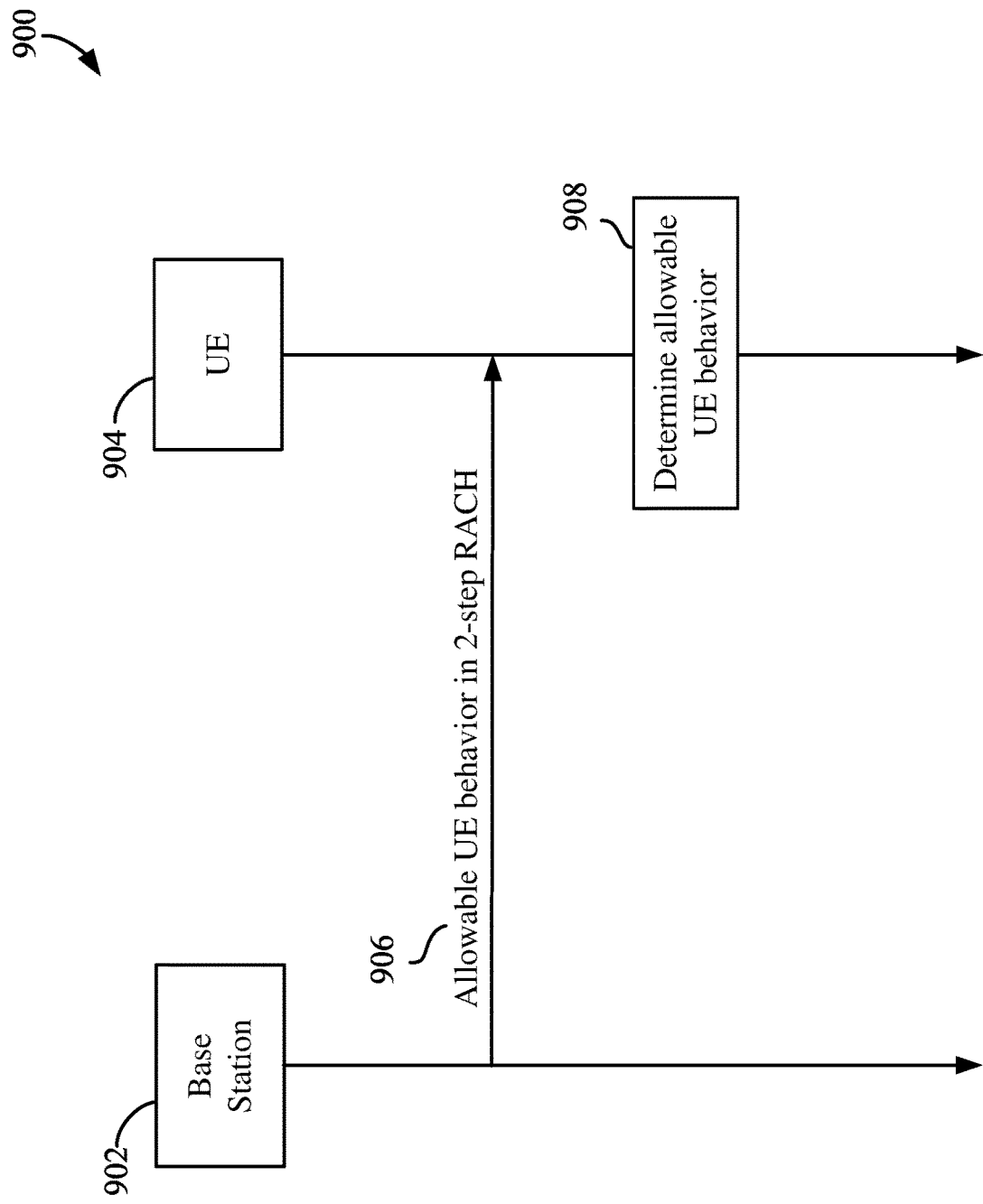
FIG. 9 is a flow chart illustrating a method for controlling user equipment behavior in a two-step RACH procedure according to some aspects of the disclosure.

FIG. 9 is a flow chart illustrating a method 900 for controlling UE behavior in a two-step RACH procedure according to some aspects of the disclosure. For example, a base station 902 can use the method 900 to control allowable UE behavior in a two-step RACH procedure as described above in relation to FIGS. 6-8. At 906, the base station 902 may signal whether or not a UE 904 is allowed to transmit a first RACH message (e.g., MsgA) including the PRACH portion only (i.e., without the PUSCH transmission) if the UE cannot support the PRACH-PUSCH gap of the selected PRACH-PUSCH resource pair. In one aspect, the base station 902 can signal the allowable UE behavior in a two-step RACH procedure in an RMSI (remaining minimum system information) for UEs in an RRC IDLE or RRC INACTIVE state. In one aspect, the base station 902 can signal the allowable UE behavior using dedicated RRC signaling for UEs in an RRC CONNECTED state. The dedicated RRC signaling, if transmitted, may overwrite common RRC signaling if both are received by the UE 904. At 908, the UE can determine if the UE can transmit a PRACH with or without the associated PUSCH transmission in the first RACH message (e.g., MsgA) of a two-step RACH procedure.

Figure 10:
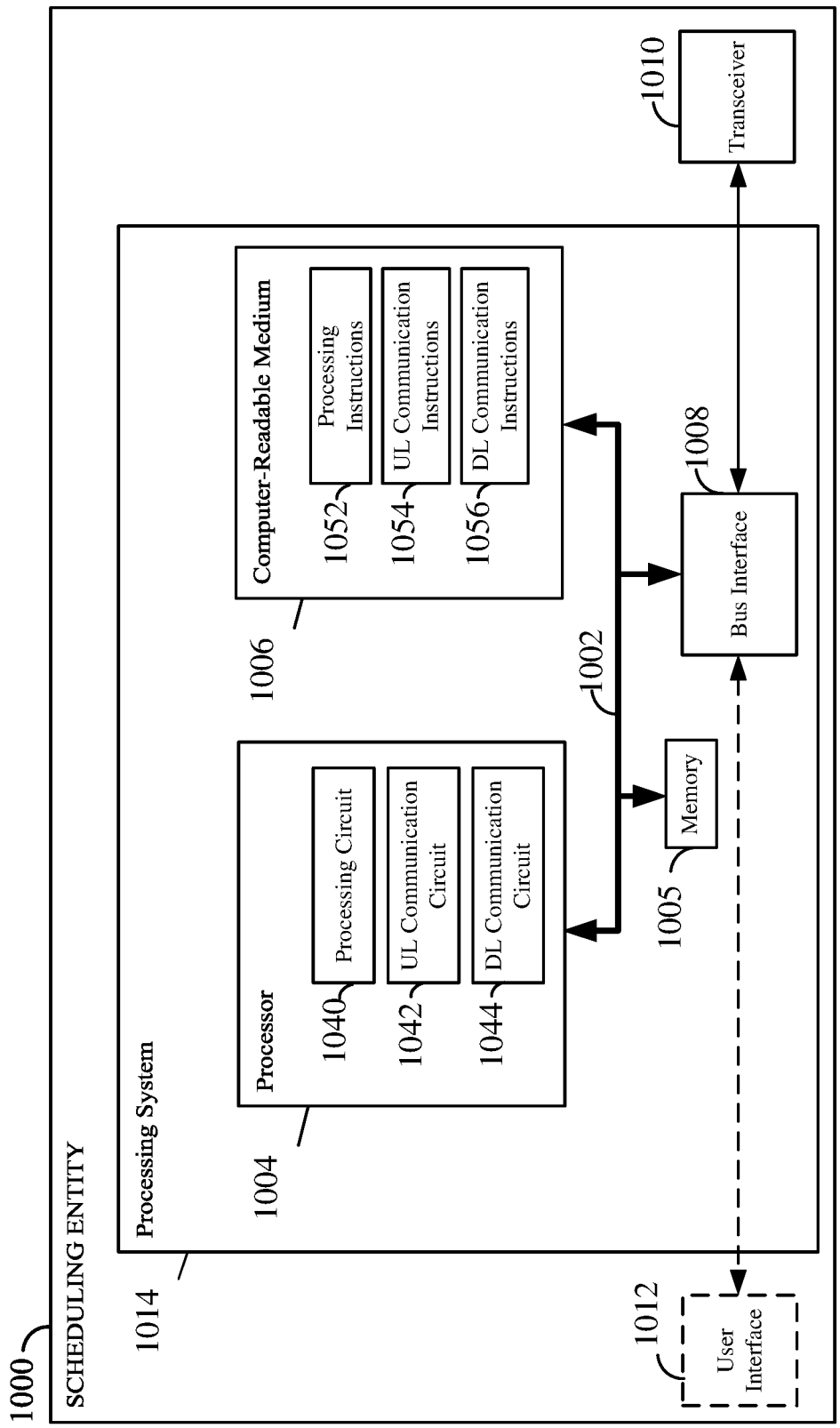
FIG. 10 is a block diagram conceptually illustrating an example of a hardware implementation for a scheduling entity according to some aspects of the disclosure.

FIG. 10 is a block diagram illustrating an example of a hardware implementation for a scheduling entity 1000 employing a processing system 1014. For example, the scheduling entity 1000 may be a base station or gNB illustrated in any one or more of FIGS. 1, 2, 4, and/or 9.

The scheduling entity 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1000 may be configured to perform any one or more of the functions described herein. That is, the processor 1004, as utilized in a scheduling entity 1000, may be used to implement any one or more of the processes and procedures described herein and illustrated in the included drawings.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a communication interface or means for communicating with various other apparatus over a transmission medium. Depending upon the nature of the apparatus, a user interface 1012 (e.g., keypad, display, speaker, microphone, joystick) may also be provided. Of course, such a user interface 1012 is optional, and may be omitted in some examples, such as a base station.

In some aspects of the disclosure, the processor 1004 may include circuitry configured for various functions, for example, 2-step random access procedure. For example, the circuitry may be configured to implement one or more of the functions described throughout this disclosure in relation to the included drawings, including FIGS. 4-9 and 11. The circuitry may include a processing circuit 1040, an UL communication circuit 1042, and a DL communication circuit 1044.

The processing circuit 1040 may be configured to perform various data and signal processing functions and algorithms, including those used to implement the various concepts and designs described in this disclosure. In some examples, the processing circuit 1040 may include one or more hardware components that provide the physical structure that performs processes related to signal processing (e.g., processing a received signal and/or processing a signal for transmission).

The UL communication circuit 1042 may be configured to perform various UL communication functions and algorithms including those used to implement the various concepts and designs described in this disclosure. In some examples, the UL communication circuit 1042 may include one or more hardware components that provide the physical structure that performs processes related to wireless communication (e.g., signal reception and processing). In addition, the UL communication circuit 1042 may further be configured to execute UL communication instructions 1054 stored on the computer-readable medium 1006 to implement one or more functions described herein.

The DL communication circuit 1044 may be configured to perform various DL communication functions and algorithms including those used to implement the various concepts and designs described in this disclosure. In some examples, the DL communication circuit 1044 may include one or more hardware components that provide the physical structure that performs processes related to wireless communication (e.g., signal transmission and processing). In addition, the DL communication circuit 1044 may further be configured to execute DL communication instructions 1056 stored on the computer-readable medium 1006 to implement one or more functions described herein.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 11:
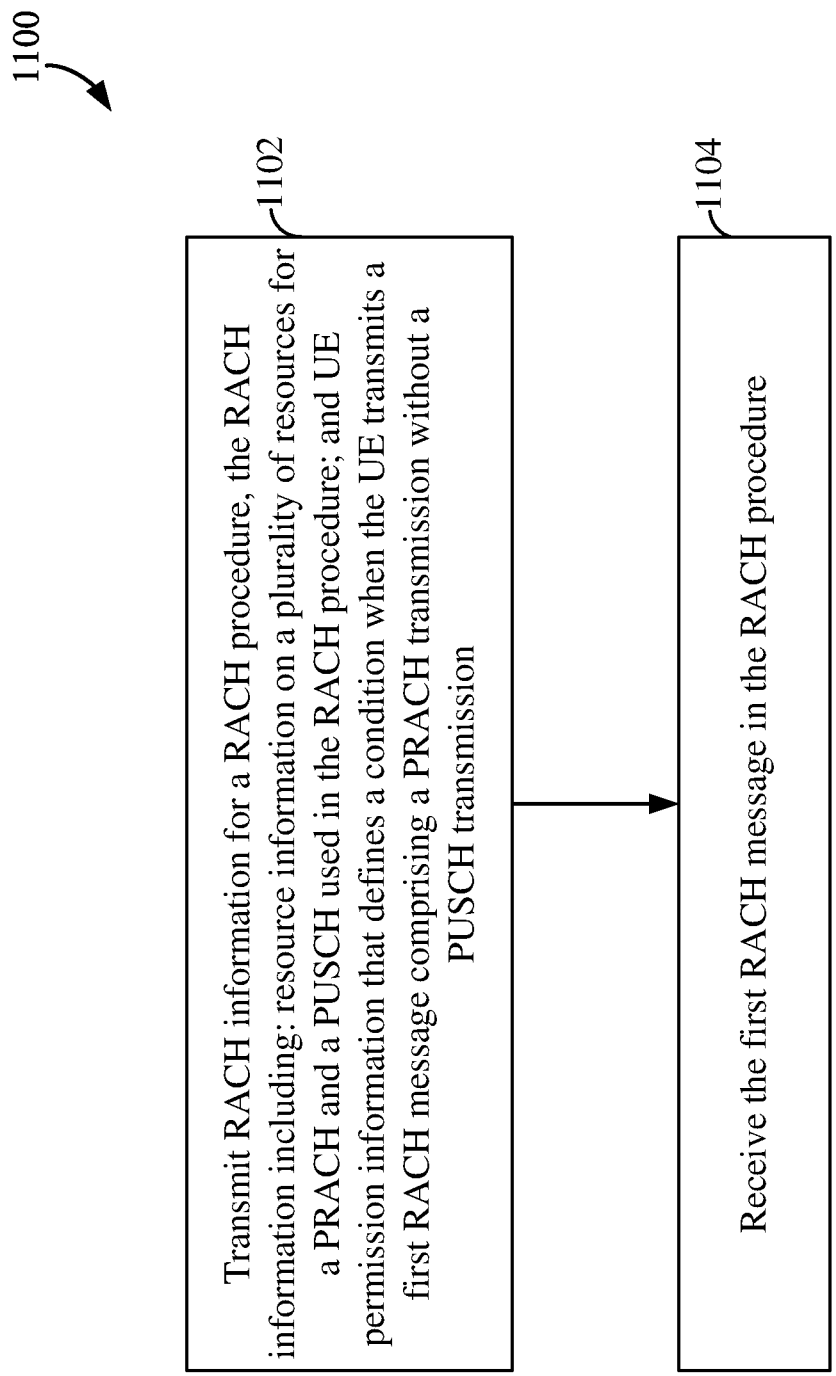
FIG. 11 is a flow chart illustrating an exemplary process for a two-step RACH procedure in accordance with some aspects of the present disclosure.

FIG. 11 is a flow chart illustrating an exemplary process 1100 for a two-step random access procedure in accordance with some aspects of the disclosure. As described below, some or all illustrated features may be omitted in a particular implementation within the scope of the present disclosure, and some illustrated features may not be required for the implementation of all examples. In some examples, the process 1100 may be carried out by the scheduling entity 1000 illustrated in FIG. 10. In some examples, the process 1100 may be carried out by any suitable apparatus or means for carrying out the functions or algorithms described below.

At block 1102, a scheduling entity (e.g., base station) transmits RACH information for a RACH procedure to a UE. The RACH information can include resource information on a plurality of resources available for a PRACH and a PUSCH used in the RACH procedure. The RACH information can further include UE permission information that defines the condition when the UE transmits a first RACH message (e.g., MsgA) including a PRACH transmission without a PUSCH transmission. In one exemplary condition, the UE can transmit a first RACH message without the PUSCH transmission when the plurality of resources do not provide a sufficient PRACH-PUSCH time gap between any PRACH and PUSCH resource pair.

In one example, the plurality of resources include a plurality of PRACH-PUSCH resource pairs (e.g., PRACH-PUSCH resource pairs 500 in FIG. 5), and each PRACH-PUSCH resource pair includes a PRACH resource and a PUSCH resource. The PRACH-PUSCH resource pairs can have different time gaps between the PRACH resource and PUSCH resource.

In one example, the UE permission information defines a condition in which the UE transmits the first RACH message including the PRACH transmission without the PUSCH transmission in a two-step RACH procedure if a time gap between any of the PRACH resource and the PUSCH resource provided by the plurality of resources is smaller than a predetermined time gap (e.g., minimum time gap) based on a capability of the UE.

In one example, the processing circuit 1040 can provide a means for preparing the RACH information for transmission. In one example, the DL communication circuit 1044 can provide a means for transmitting the RACH information via the transceiver 1010. In one example, the scheduling entity may broadcast the RACH information included in system information, for example, remaining minimum system information (RMSI) and/or other system information (OSI). The scheduling entity may periodically broadcast RMSI over the cell to provide the most basic information used for initial cell access, and for acquiring any OSI that may be broadcast periodically or sent on-demand. In one example, the scheduling entity may transmit the RACH information utilizing RRC signaling.

At block 1104, the scheduling entity receives the first RACH message of the RACH procedure from the UE, and the first RACH message can include the PRACH transmission without or without the PUSCH transmission. In one aspect, the UL communication circuit 1042 can provide a means for receiving the first RACH message via the transceiver 1010. In one example, the scheduling entity can receive the PRACH transmission and the corresponding PUSCH transmission with no time gap (e.g., less than one time domain symbol) between the PRACH transmission and the PUSCH transmission. In one example, the scheduling entity can receive the PRACH transmission and the PUSCH transmission with a time gap between the PRACH transmission and the PUSCH transmission, and the time gap is smaller than a predetermined time gap based on a capability of the UE. In one example, the scheduling entity can receive the PRACH transmission in the first RACH message without the corresponding PUSCH transmission.

Figure 12:
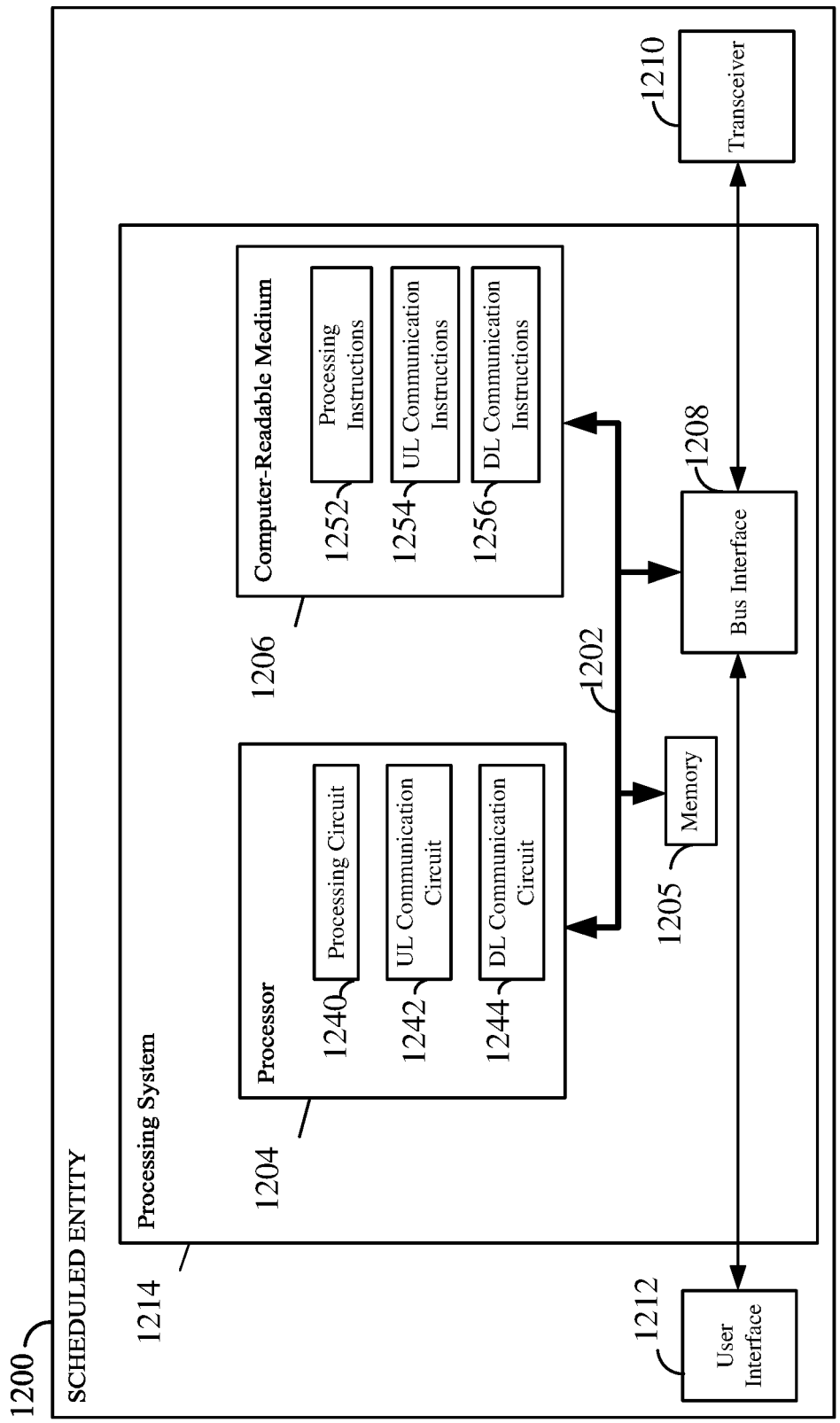
FIG. 12 is a block diagram conceptually illustrating an example of a hardware implementation for a scheduled entity according to some aspects of the disclosure.

FIG. 12 is a conceptual diagram illustrating an example of a hardware implementation for an exemplary scheduled entity 1200 employing a processing system 1214. In accordance with various aspects of the disclosure, an element, or any portion of an element, or any combination of elements may be implemented with a processing system 1214 that includes one or more processors 1204. For example, the scheduled entity 1200 may be a user equipment (UE) as illustrated in any one or more of FIGS. 1, 2, 4, and/or 8.

The processing system 1214 may be substantially the same as the processing system 914 illustrated in FIG. 9, including a bus interface 1208, a bus 1202, memory 1205, a processor 1204, and a computer-readable medium 1206. Furthermore, the scheduled entity 1200 may include a user interface 1212 and a transceiver 1210 substantially similar to those described above in FIG. 9. That is, the processor 1204, as utilized in a scheduled entity 1200, may be used to implement any one or more of the processes described in this disclosure and illustrated in the included drawings.

In some aspects of the disclosure, the processor 1204 may include circuitry configured for various functions, for example, 2-step random access procedure. For example, the circuitry may be configured to implement one or more of the functions described in this disclosure in relation to the included drawings, including FIGS. 4-9 and 13. In some aspects, the circuitry may include a processing circuit 1240, an UL communication circuit 1242, and a DL communication circuit 1244.

The processing circuit 1240 may be configured to perform various data and signal processing functions and algorithms, including those used to implement the various concepts and designs described in this disclosure. In some examples, the processing circuit 1240 may include one or more hardware components that provide the physical structure that performs processes related to signal processing (e.g., processing a received signal and/or processing a signal for transmission).

The UL communication circuit 1242 may be configured to perform various UL communication functions and algorithms including those used to implement the various concepts and designs described in this disclosure. In some examples, the UL communication circuit 1242 may include one or more hardware components that provide the physical structure that performs processes related to wireless communication (e.g., signal transmission). In addition, the UL communication circuit 1242 may further be configured to execute UL communication instructions 1254 stored on the computer-readable medium 1206 to implement one or more functions described herein.

The DL communication circuit 1244 may be configured to perform various DL communication functions and algorithms including those used to implement the various concepts and designs described in this disclosure. In some examples, the DL communication circuit 1244 may include one or more hardware components that provide the physical structure that performs processes related to wireless communication (e.g., signal reception). In addition, the DL communication circuit 1244 may further be configured to execute DL communication instructions 1256 stored on the computer-readable medium 1206 to implement one or more functions described herein.

Figure 13:
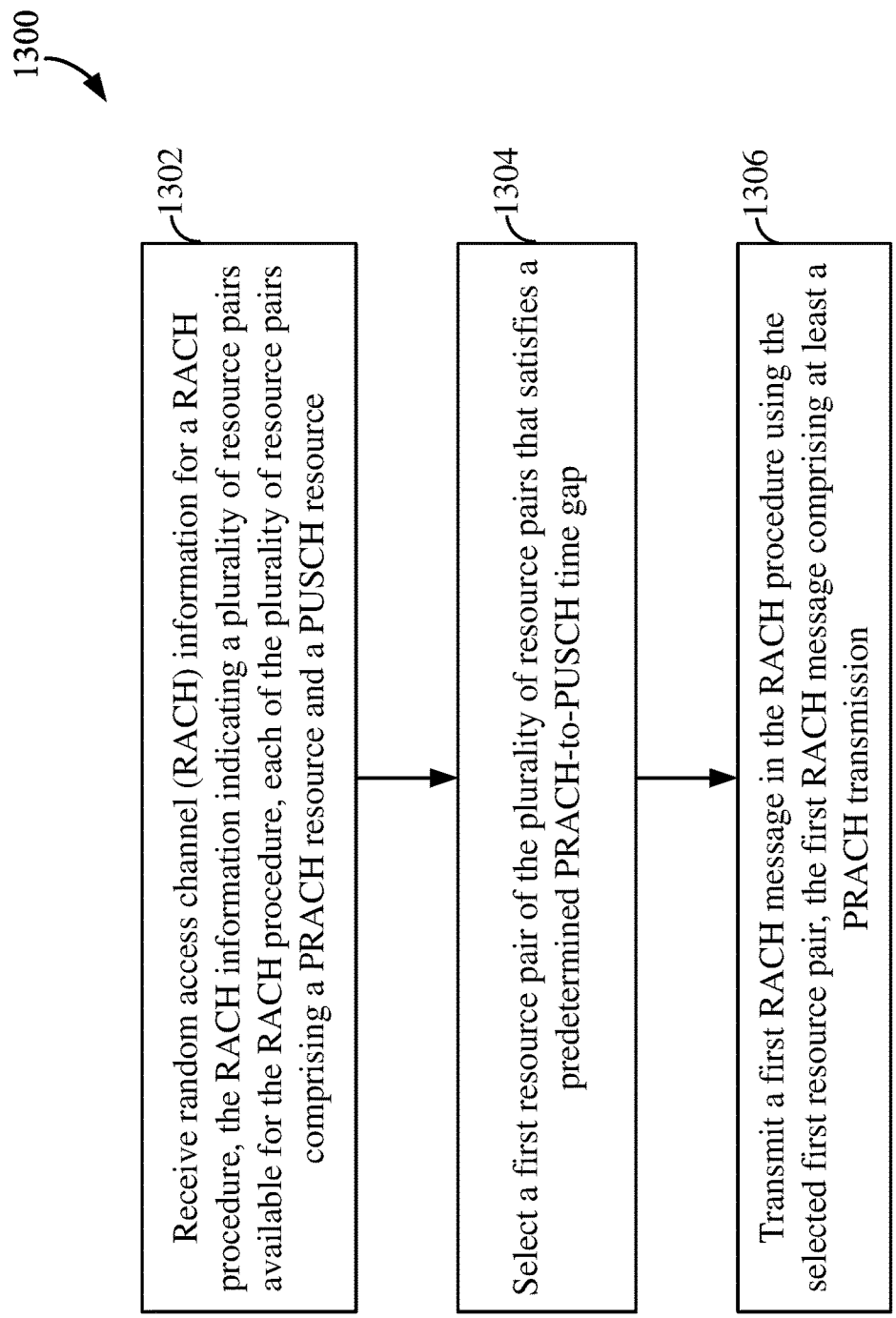
FIG. 13 is a flow chart illustrating another exemplary process for a two-step RACH procedure in accordance with some aspects of the disclosure.

FIG. 13 is a flow chart illustrating an exemplary process 1300 for a two-step RACH procedure in accordance with some aspects of the present disclosure. As described below, some or all illustrated features may be omitted in a particular implementation within the scope of the present disclosure, and some illustrated features may not be required for the implementation of all examples. In some examples, the process 1300 may be carried out by the scheduled entity 1200 illustrated in FIG. 12. In some examples, the process 1300 may be carried out by any suitable apparatus or means for carrying out the functions or algorithms described below.

At block 1302, a scheduled entity (e.g., UE 402) receives RACH information for a RACH procedure. The RACH information includes information on a plurality of resource pairs available for the RACH procedure, and each resource pair includes a PRACH resource for a PRACH and a PUSCH resource for a PUSCH. In one example, the plurality of resource pairs may be similar to the PRACH-PUSCH resource pairs 500 described above in relation to FIG. 5. In one example, the DL communication circuit 1244 can provide a means for receiving the RACH information via the transceiver 1210. In one example, the scheduled entity may receive the RACH information in system information (e.g., RMSI) that can be periodically broadcasted by the network or base station. In one example, the scheduled entity may receive the RACH information via RRC signaling. In one example, the RACH information includes UE control information for indicating whether or not a UE has permission to transmit the first RACH message (e.g., MsgA 406) without the PUSCH transmission in a RACH procedure. For example, a UE may be allowed to transmit the first RACH message including only the PRACH transmission if a time gap between any available PRACH and PUSCH resources is smaller than a minimum time gap based on a capability of the UE.

At block 1304, the scheduled entity selects a first resource pair of the plurality of resource pairs that satisfies a predetermined PRACH-PUSCH time gap. For example, the predetermined PRACH-PUSCH time gap may be at least equal to a minimum time gap between the PRACH and PUSCH transmissions based on UE capability of the scheduled entity. In one aspect, the processing circuit 1240 can provide a means for selecting the first resource pair (e.g., PRACH-PUSCH resource pair) that provides the desired time gap between PRACH and PUSCH transmissions. In some examples, the scheduled entity may not need any time gap (e.g., a time gap less than one time domain symbol). In that case, the scheduled entity may select any available PRACH-PUSCH resource pair (e.g., RO0-PUSCH0 in FIG. 5) from the available resource pairs.

At block 1306, the scheduled entity transmits, to the scheduling entity, a first RACH message of the RACH procedure using the selected first resource pair, and the first RACH message includes at least the PRACH transmission. The UL communication circuit 1242 may provide a means for transmitting the first RACH message via the transceiver 1210. In one example, the first RACH message may be the first message (e.g., MsgA 406) of a two-step RACH procedure. In one example, the first RACH message includes the PRACH transmission and a corresponding PUSCH transmission if a time gap between the PRACH resource and PUSCH resource of the first resource pair is supported by or acceptable to the scheduled entity. In one example, the first RACH message does not include a PUSCH transmission (i.e., PRACH transmission only) if a time gap between the PRACH resource and PUSCH resources of any available resource pair is not supported by or acceptable to the scheduled entity. The scheduled entity may determine whether or not the network allows PRACH-only first RACH message based on the system information (e.g., UE permission) broadcast or RRC signaling from the network.

In one example, the PRACH resource and the PUSCH resource of the first resource pair has no gap in terms of time domain symbol. In another example, a time gap between the PRACH resource and the PUSCH resource of the first resource pair is at least equal to a minimum time gap based on the capability of the UE.

Figure 14:
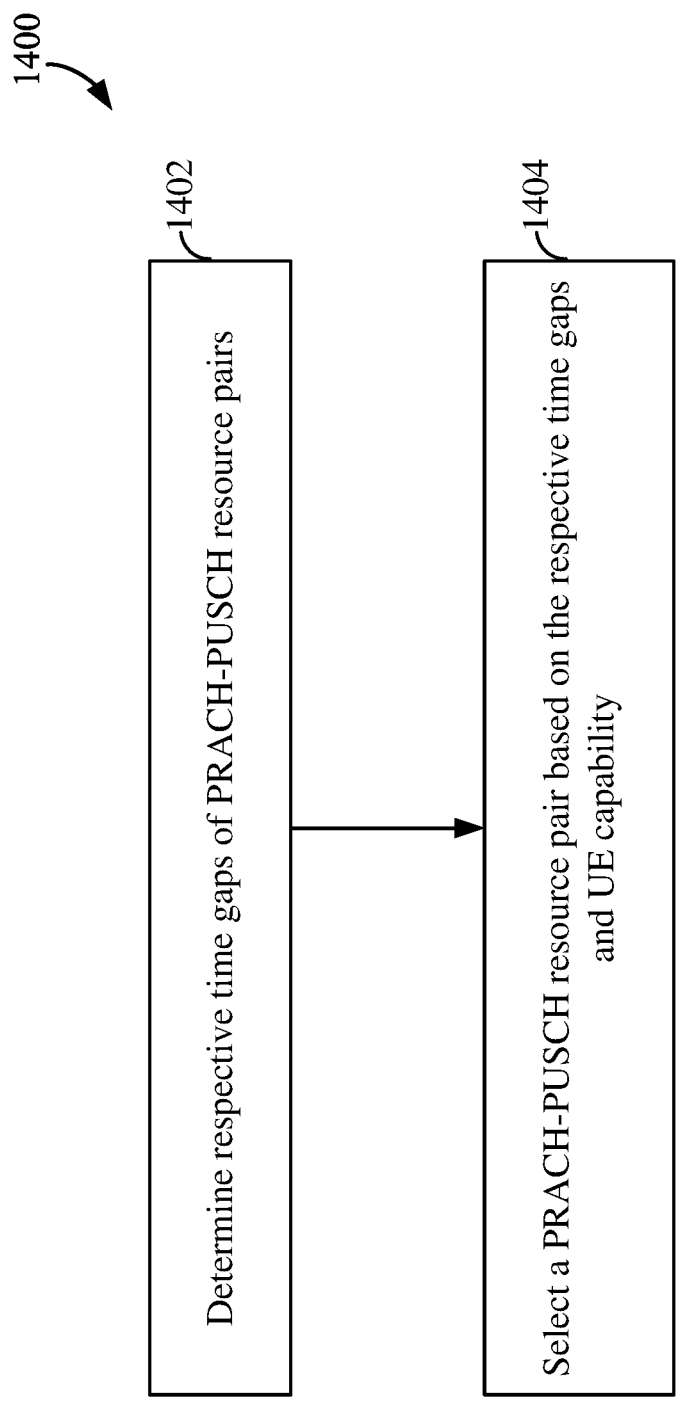
FIG. 14 is a flow chart illustrating an exemplary process for selecting a PRACH-PUSCH resource pair usable in a two-step RACH procedure in accordance with some aspects of the present disclosure.

FIG. 14 is a flow chart illustrating an exemplary process 1400 for selecting a PRACH-PUSCH resource pair usable in a two-step RACH procedure in accordance with some aspects of the present disclosure. In some examples, the process 1400 may be carried out by the scheduled entity 1200 illustrated in FIG. 12 in the process 1300 described above.

At block 1402, a scheduled entity (e.g., UE 402) determines respective time gaps of PRACH-PUSCH resource pairs. For example, the PRACH-PUSCH resource pairs may be the PRACH-PUSCH resource pairs 500 described above in relation to FIG. 5. In some aspects, each PRACH-PUSCH resource pair may have a different time gap (e.g., time gaps 510 and 512) between the PRACH resource and PUSCH resource. The scheduled entity can receive information on the PRACH-PUSCH resource pairs from the scheduling entity via system information broadcast or RRC signaling.

At block 1404, the scheduled entity selects a PRACH-PUSCH resource pair based on the respective time gaps and UE capability. For example, the UE can select a PRACH-PUSCH resource pair that has a time gap that is at least equal to the minimum time gap based on UE capability of the scheduled entity. When there are multiple PRACH-PUSCH resource pairs with sufficient time gaps, the scheduled entity can select the PRACH-PUSCH resource pair according to a predetermined rule (e.g., randomly, largest time gap, or smallest time gap).

In a first aspect, a method of wireless communication at a user equipment (UE) is provided. The method comprises receiving, from a scheduling entity, random access channel (RACH) information for a RACH procedure, the RACH information indicating a plurality of resource pairs available for the RACH procedure, each of the plurality of resource pairs comprising a physical random access channel (PRACH) resource and a physical uplink shared channel (PUSCH) resource. The method further comprises selecting a first resource pair of the plurality of resource pairs that satisfies a predetermined PRACH-to-PUSCH time gap. The method further comprises transmitting, to the scheduling entity, a first RACH message in the RACH procedure using the selected first resource pair, the first RACH message comprising at least a PRACH transmission.

In a second aspect, alone or in combination with the first aspect, wherein the plurality of resource pairs further comprise a second resource pair and a third resource pair, wherein: a first time gap between a first PRACH resource and a first PUSCH resource of the first resource pair is different from a second time gap between a second PRACH resource and a second PUSCH resource of the second resource pair; and a third time gap between a third PRACH resource and a third PUSCH resource of the third resource pair is different from the first time gap and the second time gap.

In a third aspect, alone or in combination with the second aspect, wherein the first PRACH resource, the second PRACH resource, and the third PRACH resource correspond to at least one same time domain symbol, and the first PUSCH resource, the second PUSCH resource, and the third PUSCH resource respectively correspond to different time domain symbols.

In a fourth aspect, alone or in combination with any of the second and third aspects, wherein the selecting the first resource pair comprises: selecting the first resource pair instead of the second resource pair or the third resource pair when the first time gap of the first resource pair is at least equal to a minimum time gap based on a capability of the UE, and the second time gap and the third time gap are smaller than the minimum time gap, wherein the minimum time gap is at least equal to one or more time domain symbols.

In a fifth aspect, alone or in combination with the fourth aspect, wherein the first RACH message further comprises: a PUSCH transmission using the first PUSCH resource, wherein a time domain gap between the PRACH transmission and the PUSCH transmission is at least equal to the minimum time gap.

In a sixth aspect, alone or in combination with any of the first to fifth aspects, the method further comprises: forgoing a PUSCH transmission in the first RACH message, if a time gap between the PRACH resource and the PUSCH resource of any of the plurality of resource pairs is smaller than a minimum time gap based on a capability of the UE.

In a seventh aspect, alone or in combination with any of the first to sixth aspects, wherein the receiving the RACH information comprises at least one of: receiving system information comprising the RACH information; or receiving a radio resource control (RRC) message comprising the RACH information.

In an eighth aspect, alone or in combination with any of the first to seventh aspects, wherein the RACH information further comprises UE control information for indicating that the UE has permission to transmit the first RACH message without a PUSCH transmission, if a time gap between the PRACH resource and the PUSCH resource of any of the plurality of resource pairs is smaller than a minimum time gap based on a capability of the UE.

In a ninth aspect, a user equipment (UE) is provided. The UE comprises a communication interface configured for wireless communication, a memory, and a processor operatively coupled with the communication interface and the memory. The processor and the memory are configured to receive, from a scheduling entity via the communication interface, random access channel (RACH) information for a RACH procedure, the RACH information indicating a plurality of resource pairs available for the RACH procedure, each of the plurality of resource pairs comprising a physical random access channel (PRACH) resource and a physical uplink shared channel (PUSCH) resource. The processor and the memory are further configured to select a first resource pair of the plurality of resource pairs that satisfies a predetermined PRACH-to-PUSCH time gap. The processor and the memory are further configured to transmit, to the scheduling entity, a first RACH message in the RACH procedure using the selected first resource pair, the first RACH message comprising at least a PRACH transmission.

In a tenth aspect, alone or in combination with the ninth aspect, wherein the plurality of resource pairs further comprise a second resource pair and a third resource pair, wherein: a first time gap between a first PRACH resource and a first PUSCH resource of the first resource pair is different from a second time gap between a second PRACH resource and a second PUSCH resource of the second resource pair; and a third time gap between a third PRACH resource and a third PUSCH resource of the third resource pair is different from the first time gap and the second time gap.

In an eleventh aspect, alone or in combination with the tenth aspect, wherein the first PRACH resource, the second PRACH resource, and the third PRACH resource correspond to at least one same time domain symbol, and the first PUSCH resource, the second PUSCH resource, and the third PUSCH resource respectively correspond to different time domain symbols.

In a twelfth aspect, alone or in combination with any of the tenth to eleventh aspects, wherein the processor and the memory are further configured to: select the first resource pair instead of the second resource pair or the third resource pair when the first time gap of the first resource pair is at least equal to a minimum time gap based on a capability of the UE, and the second time gap and the third time gap are smaller than the minimum time gap, wherein the minimum time gap is at least equal to one or more time domain symbols.

In a thirteenth aspect, alone or in combination with any of the ninth to twelfth aspects, wherein the first RACH message further comprises: a PUSCH transmission using the first PUSCH resource, wherein a time domain gap between the PRACH transmission and the PUSCH transmission is at least equal to the minimum time gap.

In a fourteenth aspect, alone or in combination with any of the ninth to thirteenth aspects, wherein the processor and the memory are further configured to: forgo a PUSCH transmission in the first RACH message, if a time gap between the PRACH resource and the PUSCH resource of any of the plurality of resource pairs is smaller than a minimum time gap based on a capability of the UE.

In a fifteenth aspect, alone or in combination with any of the ninth to fourteenth aspects, wherein the processor and the memory are further configured to at least one of: receive system information comprising the RACH information; or receive a radio resource control (RRC) message comprising the RACH information.

In a sixteenth aspect, alone or in combination with any of the ninth to fifteenth aspects, wherein the RACH information further comprises UE control information for indicating that the UE has permission to transmit the first RACH message without a PUSCH transmission, if a time gap between the PRACH resource and the PUSCH resource of any of the plurality of resource pairs is smaller than a minimum time gap based on a capability of the UE.

In a seventeenth aspect, a method of wireless communication at a scheduling entity is provided. The method comprises transmitting, to a user equipment (UE), random access channel (RACH) information for a RACH procedure, the RACH information comprising: resource information on a plurality of resources available for a physical random access channel (PRACH) and a physical uplink shared channel (PUSCH) used in the RACH procedure; and UE permission information for configuring the UE to transmit a first RACH message comprising a PRACH transmission in the RACH procedure without a PUSCH transmission. The method further comprises receiving, from the UE, the first RACH message in the RACH procedure.

In an eighteenth aspect, alone or in combination with the seventeenth aspect, wherein the UE permission information further configures the UE to transmit the first RACH message comprising the PRACH transmission without the PUSCH transmission if a time gap between a PRACH resource and a PUSCH resource available among the plurality of resources is smaller than a predetermined time gap based on a capability of the UE.

In a nineteenth aspect, alone or in combination with any of the seventeenth to eighteenth aspects, wherein the transmitting the RACH information comprises at least one of: transmitting system information comprising the RACH information; or transmitting a radio resource control (RRC) message comprising the RACH information.

In a twentieth aspect, alone or in combination with any of the seventeenth to nineteenth aspects, wherein the receiving the first RACH message comprises: receiving the PRACH transmission and the PUSCH transmission with no time gap between the PRACH transmission and the PUSCH transmission.

In a twenty-first aspect, alone or in combination with any of the seventeenth to nineteenth aspects, wherein the receiving the first RACH message comprises: receiving the PRACH transmission and the PUSCH transmission with a time gap between the PRACH transmission and the PUSCH transmission, the time gap is greater than a predetermined time gap based on a capability of the UE.

In a twenty-second aspect, alone or in combination with any of the seventeenth to nineteenth aspects, the method further comprises: transmitting, after receiving the PRACH transmission without receiving the PUSCH transmission in the first RACH message, a random access response (RAR) message to the UE, the RAR message scrambled by an identifier determined based on PRACH resources of the plurality of resources used for the PRACH transmission.

In a twenty-third aspect, alone or in combination with any of the seventeenth to twenty-second aspects, wherein the plurality of resources comprise a plurality of resource pairs, each of the plurality of resource pairs comprises a PRACH resource and a PUSCH resource, and each of the plurality of resource pairs has a different time gap between the PRACH resource and the PUSCH resource.

In a twenty-fourth aspect, a scheduling entity is provided. The scheduling entity comprises a communication interface configured to communicate with a user equipment (UE), a memory, and a processor operatively coupled with the communication interface and the memory. The processor and the memory are configured to: transmit, to a user equipment (UE), random access channel (RACH) information for a RACH procedure, the RACH information comprising: resource information on a plurality of resources available for a physical random access channel (PRACH) and a physical uplink shared channel (PUSCH) used in the RACH procedure; and UE permission information for configuring the UE to transmit a first RACH message comprising a PRACH transmission in the RACH procedure without a PUSCH transmission. The processor and the memory are further configured to receive, from the UE, the first RACH message in the RACH procedure.

In a twenty-fifth aspect, alone or in combination with the twenty-fourth aspect, wherein the UE permission information further configures the UE to transmit the first RACH message comprising the PRACH transmission without the PUSCH transmission if a time gap between a PRACH resource and a PUSCH resource available among the plurality of resources is smaller than a predetermined time gap based on a capability of the UE.

In a twenty-sixth aspect, alone or in combination with any of the twenty-fourth to twenty-fifth aspects, wherein the processor and the memory are further configured to: transmit system information comprising the RACH information; or transmit a radio resource control (RRC) message comprising the RACH information.

In a twenty-seventh aspect, alone or in combination with any of the twenty-fourth to twenty-sixth aspects, wherein the processor and the memory are further configured to: receive the PRACH transmission and the PUSCH transmission with no time gap between the PRACH transmission and the PUSCH transmission.

In a twenty-eighth aspect, alone or in combination with any of the twenty-fourth to twenty-sixth aspects, wherein the processor and the memory are further configured to: receive the PRACH transmission and the PUSCH transmission with a time gap between the PRACH transmission and the PUSCH transmission, the time gap is greater than a predetermined time gap based on a capability of the UE.

In a twenty-ninth aspect, alone or in combination with any of the twenty-fourth to twenty-sixth aspects, wherein the processor and the memory are further configured to: transmit, after receiving the PRACH transmission without receiving the PUSCH transmission in the first RACH message, a random access response (RAR) message to the UE, the RAR message scrambled by an identifier determined based on PRACH resources of the plurality of resources used for the PRACH transmission.

In a thirtieth aspect, alone or in combination with any of the twenty-fourth to twenty-ninth aspects, wherein the plurality of resources comprise a plurality of resource pairs, each of the plurality of resource pairs comprises a PRACH resource and a PUSCH resource, and each of the plurality of resource pairs has a different time gap between the PRACH resource and the PUSCH resource.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a user equipment (UE), comprising:
   receiving, from a scheduling entity, random access channel (RACH) information for a RACH procedure, the RACH information indicating a plurality of resource pairs available for the RACH procedure, each of the plurality of resource pairs comprising a physical random access channel (PRACH) resource and a physical uplink shared channel (PUSCH) resource;
   selecting a first resource pair of the plurality of resource pairs that satisfies a predetermined PRACH-to-PUSCH time gap; and
   transmitting, to the scheduling entity, a first RACH message in the RACH procedure using the selected first resource pair, the first RACH message comprising at least a PRACH transmission,
   wherein the plurality of resource pairs further comprise a second resource pair and a third resource pair, wherein:
      a first time gap between a first PRACH resource and a first PUSCH resource of the first resource pair is different from a second time gap between a second PRACH resource and a second PUSCH resource of the second resource pair; and
      a third time gap between a third PRACH resource and a third PUSCH resource of the third resource pair is different from the first time gap and the second time gap, and
   wherein the first PRACH resource, the second PRACH resource, and the third PRACH resource correspond to at least one same time domain symbol, and the first PUSCH resource, the second PUSCH resource, and the third PUSCH resource respectively correspond to different time domain symbols.

2. The method of claim 1, wherein the selecting the first resource pair comprises:
   selecting the first resource pair instead of the second resource pair or the third resource pair when the first time gap of the first resource pair is at least equal to a minimum time gap based on a capability of the UE, and the second time gap and the third time gap are smaller than the minimum time gap,
   wherein the minimum time gap is at least equal to one or more time domain symbols.

3. The method of claim 2, wherein the first RACH message further comprises:
   a PUSCH transmission using the first PUSCH resource, wherein a time domain gap between the PRACH transmission and the PUSCH transmission is at least equal to the minimum time gap.

4. The method of claim 1, further comprising:
   forgoing a PUSCH transmission in the first RACH message, if a time gap between the PRACH resource and the PUSCH resource of any of the plurality of resource pairs is smaller than a minimum time gap based on a capability of the UE.

5. The method of claim 1, wherein the receiving the RACH information comprises at least one of:
   receiving system information comprising the RACH information; or receiving a radio resource control (RRC) message comprising the RACH information.

6. The method of claim 1, wherein the RACH information further comprises UE control information for indicating that the UE has permission to transmit the first RACH message without a PUSCH transmission, if a time gap between the PRACH resource and the PUSCH resource of any of the plurality of resource pairs is smaller than a minimum time gap based on a capability of the UE.

7. A user equipment (UE), comprising:
a communication interface configured for wireless communication;
a memory; and
a processor operatively coupled with the communication interface and the memory,
wherein the processor and the memory are configured to:
receive, from a scheduling entity via the communication interface, random access channel (RACH) information for a RACH procedure, the RACH information indicating a plurality of resource pairs available for the RACH procedure, each of the plurality of resource pairs comprising a physical random access channel (PRACH) resource and a physical uplink shared channel (PUSCH) resource;
select a first resource pair of the plurality of resource pairs that satisfies a predetermined PRACH-to-PUSCH time gap; and
transmit, to the scheduling entity, a first RACH message in the RACH procedure using the selected first resource pair, the first RACH message comprising at least a PRACH transmission,
wherein the plurality of resource pairs further comprise a second resource pair and a third resource pair, wherein:
a first time gap between a first PRACH resource and a first PUSCH resource of the first resource pair is different from a second time gap between a second PRACH resource and a second PUSCH resource of the second resource pair; and
a third time gap between a third PRACH resource and a third PUSCH resource of the third resource pair is different from the first time gap and the second time gap, and
wherein the first PRACH resource, the second PRACH resource, and the third PRACH resource correspond to at least one same time domain symbol, and the first PUSCH resource, the second PUSCH resource, and the third PUSCH resource respectively correspond to different time domain symbols.

8. The UE of claim 7, wherein the processor and the memory are further configured to:
select the first resource pair instead of the second resource pair or the third resource pair when the first time gap of the first resource pair is at least equal to a minimum time gap based on a capability of the UE, and the second time gap and the third time gap are smaller than the minimum time gap,
wherein the minimum time gap is at least equal to one or more time domain symbols.

9. The UE of claim 8, wherein the first RACH message further comprises:
a PUSCH transmission using the first PUSCH resource, wherein a time domain gap between the PRACH transmission and the PUSCH transmission is at least equal to the minimum time gap.

10. The UE of claim 7, wherein the processor and the memory are further configured to:

forgo a PUSCH transmission in the first RACH message, if a time gap between the PRACH resource and the PUSCH resource of any of the plurality of resource pairs is smaller than a minimum time gap based on a capability of the UE.

11. The UE of claim 7, wherein the processor and the memory are further configured to at least one of:
receive system information comprising the RACH information; or
receive a radio resource control (RRC) message comprising the RACH information.

12. The UE of claim 7, wherein the RACH information further comprises UE control information for indicating that the UE has permission to transmit the first RACH message without a PUSCH transmission, if a time gap between the PRACH resource and the PUSCH resource of any of the plurality of resource pairs is smaller than a minimum time gap based on a capability of the UE.

13. A method of wireless communication at a scheduling entity, comprising:
transmitting, to a user equipment (UE), random access channel (RACH) information for a RACH procedure, the RACH information comprising:
resource information on a plurality of resources available for a physical random access channel (PRACH) and a physical uplink shared channel (PUSCH) used in the RACH procedure; and
UE permission information for configuring the UE to transmit a first RACH message comprising a PRACH transmission in the RACH procedure without a PUSCH transmission; and
receiving, from the UE, the first RACH message in the RACH procedure.

14. The method of claim 13, wherein the UE permission information further configures the UE to transmit the first RACH message comprising the PRACH transmission without the PUSCH transmission if a time gap between a PRACH resource and a PUSCH resource available among the plurality of resources is smaller than a predetermined time gap based on a capability of the UE.

15. The method of claim 14, wherein the transmitting the RACH information comprises, at least one of:
transmitting system information comprising the RACH information; or
transmitting a radio resource control (RRC) message comprising the RACH information.

16. The method of claim 13, wherein the receiving the first RACH message comprises:
receiving the PRACH transmission and the PUSCH transmission with no time gap between the PRACH transmission and the PUSCH transmission.

17. The method of claim 13, wherein the receiving the first RACH message comprises:
receiving the PRACH transmission and the PUSCH transmission with a time gap between the PRACH transmission and the PUSCH transmission, the time gap is greater than a predetermined time gap based on a capability of the UE.

18. The method of claim 13, further comprising:
transmitting, after receiving the PRACH transmission without receiving the PUSCH transmission in the first RACH message, a random access response (RAR) message to the UE, the RAR message scrambled by an identifier determined based on PRACH resources of the plurality of resources used for the PRACH transmission.

19. The method of claim 13, wherein the plurality of resources comprise a plurality of resource pairs, each of the plurality of resource pairs comprises a PRACH resource and a PUSCH resource, and each of the plurality of resource pairs has a different time gap between the PRACH resource and the PUSCH resource.

20. A scheduling entity comprising:
a communication interface configured to communicate with a user equipment (UE);
a memory; and
a processor operatively coupled with the communication interface and the memory,
wherein the processor and the memory are configured to:
transmit, to a user equipment (UE), random access channel (RACH) information for a RACH procedure, the RACH information comprising:
resource information on a plurality of resources available for a physical random access channel (PRACH) and a physical uplink shared channel (PUSCH) used in the RACH procedure; and
UE permission information for configuring the UE to transmit a first RACH message comprising a PRACH transmission in the RACH procedure without a PUSCH transmission; and
receive, from the UE, the first RACH message in the RACH procedure.

21. The scheduling entity of claim 20, wherein the UE permission information further configures the UE to transmit the first RACH message comprising the PRACH transmission without the PUSCH transmission if a time gap between a PRACH resource and a PUSCH resource available among the plurality of resources is smaller than a predetermined time gap based on a capability of the UE.

22. The scheduling entity of claim 21, wherein the processor and the memory are further configured to, at least one of:
transmit system information comprising the RACH information; or
transmit a radio resource control (RRC) message comprising the RACH information.

23. The scheduling entity of claim 20, wherein the processor and the memory are further configured to:
receive the PRACH transmission and the PUSCH transmission with no time gap between the PRACH transmission and the PUSCH transmission.

24. The scheduling entity of claim 20, wherein the processor and the memory are further configured to:
receive the PRACH transmission and the PUSCH transmission with a time gap between the PRACH transmission and the PUSCH transmission, the time gap is greater than a predetermined time gap based on a capability of the UE.

25. The scheduling entity of claim 20, wherein the processor and the memory are further configured to:
transmit, after receiving the PRACH transmission without receiving the PUSCH transmission in the first RACH message, a random access response (RAR) message to the UE, the RAR message scrambled by an identifier determined based on PRACH resources of the plurality of resources used for the PRACH transmission.

26. The scheduling entity of claim 20, wherein the plurality of resources comprise a plurality of resource pairs, each of the plurality of resource pairs comprises a PRACH resource and a PUSCH resource, and each of the plurality of resource pairs has a different time gap between the PRACH resource and the PUSCH resource.

* * * * *